(12) United States Patent
Lines et al.

(10) Patent No.: US 8,248,696 B2
(45) Date of Patent: Aug. 21, 2012

(54) NANO FRACTAL DIFFUSER

(75) Inventors: Michael Lines, Cedar Hills, UT (US); Eric W. Gardner, Eagle Mountain, UT (US); Mark Davis, Springville, UT (US)

(73) Assignee: Moxtek, Inc., Orem, UT (US)

( * ) Notice: Subject to any disclaimer, the term of this patent is extended or adjusted under 35 U.S.C. 154(b) by 338 days.

(21) Appl. No.: 12/491,513

(22) Filed: Jun. 25, 2009

(65) Prior Publication Data

US 2010/0328768 A1     Dec. 30, 2010

(51) Int. Cl.
*G02B 5/30* (2006.01)
*G02B 27/28* (2006.01)

(52) U.S. Cl. ............... 359/485.05; 359/572; 359/599

(58) Field of Classification Search ............ 359/485.05, 359/569, 572, 573, 574, 575, 576, 599
See application file for complete search history.

(56) References Cited

U.S. PATENT DOCUMENTS

| | | | |
|---|---|---|---|
| 2,224,214 A | 12/1940 | Brown | |
| 2,237,567 A | 4/1941 | Land | |
| 2,287,598 A | 6/1942 | Brown | |
| 2,391,451 A | 12/1945 | Fischer | |
| 2,403,731 A | 7/1946 | MacNeille | |
| 2,605,352 A | 7/1952 | Fischer | |
| 2,748,659 A | 6/1956 | Geffcken et al. | |
| 2,813,146 A | 11/1957 | Glenn | |
| 2,815,452 A | 12/1957 | Mertz | |
| 2,887,566 A | 5/1959 | Marks | |
| 3,046,839 A | 7/1962 | Bird et al. | |
| 3,084,590 A | 4/1963 | Glenn, Jr. | |
| 3,202,039 A | 8/1965 | Lang et al. | |
| 3,213,753 A | 10/1965 | Rogers | |
| 3,235,630 A | 2/1966 | Doherty et al. | |
| 3,291,550 A | 12/1966 | Bird et al. | |
| 3,291,871 A | 12/1966 | Francis | |
| 3,293,331 A | 12/1966 | Doherty | |
| 3,436,143 A | 4/1969 | Garrett | |
| 3,479,168 A | 11/1969 | Bird et al. | |
| 3,536,373 A | 10/1970 | Bird et al. | |
| 3,566,099 A | 2/1971 | Makas | |
| 3,627,431 A | 12/1971 | Komarniski | |

(Continued)

FOREIGN PATENT DOCUMENTS

DE            10327963            1/2005

(Continued)

OTHER PUBLICATIONS

U.S. Appl. No. 13/234,444, filed Aug. 16, 2011, Raymond T. Perkins.

(Continued)

*Primary Examiner* — Ricky D Shafer
(74) *Attorney, Agent, or Firm* — Thorpe North & Western LLP

(57) ABSTRACT

A diffusive device has an array of discrete facets which may be of a size and pattern similar to a fractal. The facet dimensions can be greater than half the wavelength of incident light such that the facets substantially diffract light. A polarizing wire-grid layer comprised of an array of elongated parallel conductive wires with a period less than half the wavelength of incident light may be disposed between, beneath, or above the facets. The wire-grid polarizes the light by substantially reflecting light having an s-polarization orientation and substantially transmitting a portion of light having a p-polarization orientation.

13 Claims, 12 Drawing Sheets

U.S. PATENT DOCUMENTS

| | | | |
|---|---|---|---|
| 3,631,288 A | 12/1971 | Rogers | |
| 3,653,741 A | 4/1972 | Marks | |
| 3,731,986 A | 5/1973 | Fergason | |
| 3,857,627 A | 12/1974 | Harsch | |
| 3,857,628 A | 12/1974 | Strong | |
| 3,876,285 A | 4/1975 | Schwarzmüller | |
| 3,877,789 A | 4/1975 | Marie | |
| 3,912,369 A | 10/1975 | Kashnow | |
| 3,969,545 A | 7/1976 | Slocum | |
| 4,009,933 A | 3/1977 | Firester | |
| 4,025,164 A | 5/1977 | Doriguzzi et al. | |
| 4,025,688 A | 5/1977 | Nagy et al. | |
| 4,049,944 A | 9/1977 | Garvin et al. | |
| 4,068,260 A | 1/1978 | Ohneda et al. | |
| 4,073,571 A | 2/1978 | Grinberg et al. | |
| 4,104,598 A | 8/1978 | Abrams | |
| 4,181,756 A | 1/1980 | Fergason | |
| 4,220,705 A | 9/1980 | Sugibuchi et al. | |
| 4,221,464 A | 9/1980 | Pedinoff et al. | |
| 4,268,127 A | 5/1981 | Oshima et al. | |
| 4,289,381 A | 9/1981 | Garvin et al. | |
| 4,294,119 A | 10/1981 | Soldner | |
| 4,308,079 A | 12/1981 | Venables et al. | |
| 4,441,791 A | 4/1984 | Hornbeck | |
| 4,456,515 A | 6/1984 | Krueger et al. | |
| 4,466,704 A | 8/1984 | Schuler et al. | |
| 4,492,432 A | 1/1985 | Kaufmann et al. | |
| 4,512,638 A | 4/1985 | Sriram et al. | |
| 4,514,479 A | 4/1985 | Ferrante | |
| 4,515,441 A | 5/1985 | Wentz | |
| 4,515,443 A | 5/1985 | Bly | |
| 4,532,619 A | 7/1985 | Sugiyama et al. | |
| 4,560,599 A | 12/1985 | Regen | |
| 4,679,910 A | 7/1987 | Efron et al. | |
| 4,688,897 A | 8/1987 | Grinberg et al. | |
| 4,701,028 A | 10/1987 | Clerc et al. | |
| 4,711,530 A | 12/1987 | Nakanowatari et al. | |
| 4,712,881 A | 12/1987 | Shurtz, II et al. | |
| 4,724,436 A | 2/1988 | Johansen et al. | |
| 4,743,092 A | 5/1988 | Pistor | |
| 4,743,093 A | 5/1988 | Oinen | |
| 4,759,611 A | 7/1988 | Downey, Jr. | |
| 4,759,612 A | 7/1988 | Nakatsuka et al. | |
| 4,763,972 A | 8/1988 | Papuchon et al. | |
| 4,795,233 A | 1/1989 | Chang | |
| 4,799,776 A | 1/1989 | Yamazaki et al. | |
| 4,818,076 A | 4/1989 | Heppke et al. | |
| 4,840,757 A | 6/1989 | Blenkhorn | |
| 4,865,670 A | 9/1989 | Marks | |
| 4,870,649 A | 9/1989 | Bobeck et al. | |
| 4,893,905 A | 1/1990 | Efron et al. | |
| 4,895,769 A | 1/1990 | Land et al. | |
| 4,904,060 A | 2/1990 | Grupp | |
| 4,913,529 A | 4/1990 | Goldenberg et al. | |
| 4,915,463 A | 4/1990 | Barbee, Jr. | |
| 4,939,526 A | 7/1990 | Tsuda | |
| 4,946,231 A | 8/1990 | Pistor | |
| 4,966,438 A | 10/1990 | Mouchart et al. | |
| 4,974,941 A | 12/1990 | Gibbons et al. | |
| 4,991,937 A | 2/1991 | Urino | |
| 5,029,988 A | 7/1991 | Urino | |
| 5,039,185 A | 8/1991 | Uchida et al. | |
| 5,061,050 A | 10/1991 | Ogura | |
| 5,087,985 A | 2/1992 | Kitaura et al. | |
| 5,092,774 A | 3/1992 | Milan | |
| 5,113,285 A | 5/1992 | Franklin et al. | |
| 5,115,305 A | 5/1992 | Baur | |
| 5,122,887 A | 6/1992 | Mathewson | |
| 5,122,907 A | 6/1992 | Slocum | |
| 5,139,340 A | 8/1992 | Okumura | |
| 5,157,526 A | 10/1992 | Kondo et al. | |
| 5,163,877 A | 11/1992 | Marpert et al. | |
| 5,177,635 A | 1/1993 | Keilmann | |
| 5,196,926 A | 3/1993 | Lee | |
| 5,196,953 A | 3/1993 | Yeh et al. | |
| 5,198,921 A | 3/1993 | Aoshima et al. | |
| 5,204,765 A | 4/1993 | Mitsui et al. | |
| 5,206,674 A | 4/1993 | Puech et al. | |
| 5,216,539 A | 6/1993 | Boher et al. | |
| 5,225,920 A | 7/1993 | Kasazumi et al. | |
| 5,235,443 A | 8/1993 | Barnik et al. | |
| 5,235,449 A | 8/1993 | Imazeki et al. | |
| 5,239,322 A | 8/1993 | Takanashi et al. | |
| 5,245,471 A | 9/1993 | Iwatsuka et al. | |
| 5,267,029 A | 11/1993 | Kurematsu | |
| 5,279,689 A | 1/1994 | Shvartsman | |
| 5,295,009 A | 3/1994 | Barnik et al. | |
| 5,298,199 A | 3/1994 | Hirose et al. | |
| 5,305,143 A | 4/1994 | Taga et al. | |
| 5,325,218 A | 6/1994 | Willett et al. | |
| 5,333,072 A | 7/1994 | Willett | |
| 5,349,192 A | 9/1994 | Mackay | |
| 5,357,370 A | 10/1994 | Miyatake et al. | |
| 5,383,053 A | 1/1995 | Hegg et al. | |
| 5,387,953 A | 2/1995 | Minoura et al. | |
| 5,391,091 A | 2/1995 | Nations | |
| 5,401,587 A | 3/1995 | Motohiro et al. | |
| 5,422,756 A | 6/1995 | Weber | |
| 5,430,573 A | 7/1995 | Araujo et al. | |
| 5,436,761 A | 7/1995 | Kamon | |
| 5,455,589 A | 10/1995 | Huguenin et al. | |
| 5,466,319 A | 11/1995 | Zager et al. | |
| 5,477,359 A | 12/1995 | Okazaki | |
| 5,485,499 A | 1/1996 | Pew et al. | |
| 5,486,935 A | 1/1996 | Kalmanash | |
| 5,486,949 A | 1/1996 | Schrenk et al. | |
| 5,490,003 A | 2/1996 | Van Sprang | |
| 5,499,126 A | 3/1996 | Abileah et al. | |
| 5,504,603 A | 4/1996 | Winker et al. | |
| 5,506,704 A | 4/1996 | Broer et al. | |
| 5,508,830 A | 4/1996 | Imoto et al. | |
| 5,510,215 A | 4/1996 | Prince et al. | |
| 5,513,023 A | 4/1996 | Fritz et al. | |
| 5,513,035 A | 4/1996 | Miyatake et al. | |
| 5,517,356 A | 5/1996 | Araujo et al. | |
| 5,535,047 A | 7/1996 | Hornbeck | |
| 5,548,427 A | 8/1996 | May | |
| 5,555,186 A | 9/1996 | Shioya | |
| 5,557,343 A | 9/1996 | Yamagishi | |
| 5,559,634 A | 9/1996 | Weber | |
| 5,570,213 A | 10/1996 | Ruiz et al. | |
| 5,570,215 A | 10/1996 | Omae et al. | |
| 5,574,580 A | 11/1996 | Ansley | |
| 5,576,854 A | 11/1996 | Schmidt et al. | |
| 5,579,138 A | 11/1996 | Sannohe et al. | |
| 5,594,561 A | 1/1997 | Blanchard | |
| 5,599,551 A | 2/1997 | Kelly | |
| 5,600,383 A | 2/1997 | Hornbeck | |
| 5,602,661 A | 2/1997 | Schadt et al. | |
| 5,609,939 A | 3/1997 | Petersen et al. | |
| 5,612,820 A | 3/1997 | Schrenk et al. | |
| 5,614,035 A | 3/1997 | Nadkarni | |
| 5,619,352 A | 4/1997 | Koch et al. | |
| 5,619,356 A | 4/1997 | Kozo et al. | |
| 5,620,755 A | 4/1997 | Smith, Jr. et al. | |
| 5,626,408 A | 5/1997 | Heynderickx et al. | |
| 5,638,197 A | 6/1997 | Gunning, III et al. | |
| 5,652,667 A | 7/1997 | Kurogane | |
| 5,658,060 A | 8/1997 | Dove | |
| 5,686,979 A | 11/1997 | Weber et al. | |
| 5,706,063 A | 1/1998 | Hong | |
| 5,706,131 A | 1/1998 | Ichimura et al. | |
| 5,719,695 A | 2/1998 | Heimbuch | |
| 5,731,246 A | 3/1998 | Bakeman et al. | |
| 5,748,368 A | 5/1998 | Tamada et al. | |
| 5,748,369 A | 5/1998 | Yokota | |
| 5,751,388 A | 5/1998 | Larson | |
| 5,751,466 A | 5/1998 | Dowling et al. | |
| 5,767,827 A | 6/1998 | Kobayashi et al. | |
| 5,798,819 A | 8/1998 | Hattori et al. | |
| 5,808,795 A | 9/1998 | Shimomura et al. | |
| 5,826,959 A | 10/1998 | Atsuchi | |
| 5,826,960 A | 10/1998 | Gotoh et al. | |
| 5,828,489 A | 10/1998 | Johnson et al. | |
| 5,833,360 A | 11/1998 | Knox et al. | |
| 5,838,403 A | 11/1998 | Jannson et al. | |
| 5,841,494 A | 11/1998 | Hall | |

| | | |
|---|---|---|
| 5,844,722 A | 12/1998 | Stephens et al. |
| 5,864,427 A | 1/1999 | Fukano et al. |
| 5,886,754 A | 3/1999 | Kuo |
| 5,890,095 A | 3/1999 | Barbour et al. |
| 5,898,521 A | 4/1999 | Okada |
| 5,899,551 A | 5/1999 | Neijzen et al. |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,973,833 A | 10/1999 | Booth et al. |
| 5,978,056 A | 11/1999 | Shintani et al. |
| 5,982,541 A | 11/1999 | Li et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,871 A | 12/1999 | Okumura |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,049,428 A | 4/2000 | Khan et al. |
| 6,053,616 A | 4/2000 | Fujimori et al. |
| 6,055,103 A | 4/2000 | Woodgate et al. |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,108,131 A | 8/2000 | Hansen et al. |
| 6,122,103 A | 9/2000 | Perkins et al. |
| 6,122,403 A | 9/2000 | Rhoads |
| 6,124,971 A | 9/2000 | Ouderkirk et al. |
| 6,141,075 A | 10/2000 | Ohmuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,181,458 B1 | 1/2001 | Brazas, Jr. et al. |
| 6,185,041 B1 | 2/2001 | TadicGaleb et al. |
| 6,208,463 B1 | 3/2001 | Hansen et al. |
| 6,215,547 B1 | 4/2001 | Ramanujan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,249,378 B1 | 6/2001 | Shimamura et al. |
| 6,250,762 B1 | 6/2001 | Kuijper |
| 6,251,297 B1 | 6/2001 | Komura et al. |
| 6,282,025 B1 | 8/2001 | Huang et al. |
| 6,288,840 B1 | 9/2001 | Perkins et al. |
| 6,291,797 B1 | 9/2001 | Koyama et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,390,626 B2 | 5/2002 | Knox |
| 6,398,364 B1 | 6/2002 | Bryars |
| 6,406,151 B1 | 6/2002 | Fujimori |
| 6,409,525 B1 | 6/2002 | Hoelscher et al. |
| 6,411,749 B2 | 6/2002 | Teng et al. |
| 6,424,436 B1 | 7/2002 | Yamanaka |
| 6,426,837 B1 | 7/2002 | Clark et al. |
| 6,447,120 B1 | 9/2002 | Hansen et al. |
| 6,452,724 B1 | 9/2002 | Hansen et al. |
| 6,460,998 B1 | 10/2002 | Watanabe |
| 6,473,236 B2 | 10/2002 | Tadic-Galeb et al. |
| 6,486,997 B1 | 11/2002 | Bruzzone et al. |
| 6,490,017 B1 | 12/2002 | Huang et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,583,930 B1 | 6/2003 | Schrenk et al. |
| 6,585,378 B2 | 7/2003 | Kurtz et al. |
| 6,624,936 B2 | 9/2003 | Kotchick et al. |
| 6,643,077 B2 | 11/2003 | Magarill et al. |
| 6,654,168 B1 | 11/2003 | Borrelli |
| 6,661,475 B1 | 12/2003 | Stahl et al. |
| 6,661,484 B1 | 12/2003 | Iwai et al. |
| 6,665,119 B1 | 12/2003 | Kurtz et al. |
| 6,666,556 B2 | 12/2003 | Hansen et al. |
| 6,669,343 B2 | 12/2003 | Shahzad et al. |
| 6,698,891 B2 | 3/2004 | Kato |
| 6,704,469 B1 | 3/2004 | Xie et al. |
| 6,710,921 B2 | 3/2004 | Hansen et al. |
| 6,714,350 B2 | 3/2004 | Silverstein et al. |
| 6,721,096 B2 | 4/2004 | Bruzzone et al. |
| 6,739,723 B1 | 5/2004 | Haven et al. |
| 6,746,122 B2 | 6/2004 | Knox |
| 6,764,181 B2 | 7/2004 | Magarill et al. |
| 6,769,779 B1 | 8/2004 | Ehrne et al. |
| 6,781,640 B1 | 8/2004 | Huang |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,809,864 B2 | 10/2004 | Martynov et al. |
| 6,809,873 B2 | 10/2004 | Cobb |
| 6,811,274 B2 | 11/2004 | Olczak |
| 6,813,077 B2 | 11/2004 | Borrelli et al. |
| 6,816,290 B2 | 11/2004 | Mukawa |
| 6,821,135 B1 | 11/2004 | Martin |
| 6,823,093 B2 | 11/2004 | Chang et al. |
| 6,829,090 B2 | 12/2004 | Katsumata et al. |
| 6,844,971 B2 | 1/2005 | Silverstein et al. |
| 6,846,089 B2 | 1/2005 | Stevenson et al. |
| 6,859,303 B2 | 2/2005 | Wang et al. |
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,920,272 B2 | 7/2005 | Wang |
| 6,922,287 B2 | 7/2005 | Wiki et al. |
| 6,926,410 B2 | 8/2005 | Weber et al. |
| 6,927,915 B2 | 8/2005 | Nakai |
| 6,934,082 B2 | 8/2005 | Allen et al. |
| 6,943,941 B2 | 9/2005 | Flagello et al. |
| 6,947,215 B2 | 9/2005 | Hoshi |
| 6,954,245 B2 | 10/2005 | Mi et al. |
| 6,972,906 B2 | 12/2005 | Hasman et al. |
| 6,976,759 B2 | 12/2005 | Magarill et al. |
| 6,981,771 B1 | 1/2006 | Arai et al. |
| 7,009,768 B2 | 3/2006 | Sakamoto |
| 7,013,064 B2 | 3/2006 | Wang |
| 7,023,512 B2 | 4/2006 | Kurtz et al. |
| 7,023,602 B2 | 4/2006 | Aastuen et al. |
| 7,025,464 B2 | 4/2006 | Beeson et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 * | 10/2006 | Mori et al. ............... 438/745 |
| 7,131,737 B2 | 11/2006 | Silverstein et al. |

| | | | | | | |
|---|---|---|---|---|---|---|
| 7,142,363 B2 | 11/2006 | Sato et al. | | 2005/0018308 A1 | 1/2005 | Cassarley et al. |
| 7,142,375 B2 | 11/2006 | Nikolov et al. | | 2005/0045799 A1 | 3/2005 | Deng et al. |
| 7,155,073 B2 | 12/2006 | Momoki et al. | | 2005/0046941 A1 | 3/2005 | Satoh et al. |
| 7,158,302 B2 | 1/2007 | Chiu et al. | | 2005/0078374 A1 | 4/2005 | Tairo et al. |
| 7,159,987 B2 | 1/2007 | Sakata | | 2005/0084613 A1 | 4/2005 | Wang et al. |
| 7,177,259 B2 | 2/2007 | Nishi et al. | | 2005/0088739 A1 | 4/2005 | Chiu et al. |
| 7,184,115 B2 | 2/2007 | Mi et al. | | 2005/0122587 A1 | 6/2005 | Ouderkirk et al. |
| 7,185,984 B2 | 3/2007 | Akiyama | | 2005/0128567 A1 | 6/2005 | Wang et al. |
| 7,213,920 B2 | 5/2007 | Matsui et al. | | 2005/0128587 A1 | 6/2005 | Suganuma |
| 7,220,371 B2 | 5/2007 | Suganuma | | 2005/0152033 A1 | 7/2005 | Kang et al. |
| 7,221,420 B2 | 5/2007 | Silverstein et al. | | 2005/0179995 A1 | 8/2005 | Nikolov et al. |
| 7,221,501 B2 | 5/2007 | Flagello et al. | | 2005/0180014 A1 | 8/2005 | Nikolov et al. |
| 7,227,684 B2 | 6/2007 | Wang et al. | | 2005/0181128 A1 | 8/2005 | Nikolov et al. |
| 7,230,766 B2 | 6/2007 | Rogers | | 2005/0190445 A1 | 9/2005 | Fukuzaki |
| 7,234,816 B2 | 6/2007 | Bruzzone et al. | | 2005/0195485 A1 | 9/2005 | Hirai et al. |
| 7,236,655 B2 | 6/2007 | Momoki et al. | | 2005/0201656 A1 | 9/2005 | Nikolov et al. |
| 7,255,444 B2 | 8/2007 | Nakashima et al. | | 2005/0206847 A1 | 9/2005 | Hansen et al. |
| 7,256,938 B2 | 8/2007 | Barton et al. | | 2005/0213043 A1 | 9/2005 | Nakashima et al. |
| 7,268,946 B2 | 9/2007 | Wang | | 2005/0259324 A1 | 11/2005 | Flagello et al. |
| 7,306,338 B2 | 12/2007 | Hansen et al. | | 2005/0271091 A1 | 12/2005 | Wang |
| 7,375,887 B2 | 5/2008 | Hansen | | 2005/0275944 A1 | 12/2005 | Wang et al. |
| 7,414,784 B2 | 8/2008 | Mi et al. | | 2005/0277063 A1 | 12/2005 | Wang et al. |
| 7,561,332 B2 | 7/2009 | Little et al. | | 2006/0001969 A1 | 1/2006 | Wang et al. |
| 7,570,424 B2 | 8/2009 | Perkins et al. | | 2006/0061862 A1 | 3/2006 | Mi et al. |
| 7,619,816 B2 | 11/2009 | Deng et al. | | 2006/0072074 A1 | 4/2006 | Matsui et al. |
| 7,630,133 B2 | 12/2009 | Perkins | | 2006/0072194 A1 | 4/2006 | Lee |
| 7,670,758 B2 | 3/2010 | Wang et al. | | 2006/0087602 A1 | 4/2006 | Kunisada et al. |
| 7,692,860 B2 | 4/2010 | Sato et al. | | 2006/0092513 A1 | 5/2006 | Momoki |
| 7,722,194 B2 | 5/2010 | Amako | | 2006/0103810 A1 | 5/2006 | Ma et al. |
| 7,755,718 B2 * | 7/2010 | Amako et al. ................. 349/96 | | 2006/0113279 A1 | 6/2006 | Little |
| 7,789,515 B2 | 9/2010 | Hansen et al. | | 2006/0118514 A1 | 6/2006 | Little et al. |
| 7,813,039 B2 | 10/2010 | Perkins | | 2006/0119937 A1 | 6/2006 | Perkins |
| 7,944,544 B2 * | 5/2011 | Amako et al. ................ 349/201 | | 2006/0127829 A1 | 6/2006 | Deng et al. |
| 8,009,355 B2 * | 8/2011 | Nakai ..................... 359/485.05 | | 2006/0127830 A1 * | 6/2006 | Deng et al. .................... 431/188 |
| 8,027,087 B2 | 9/2011 | Perkins et al. | | 2006/0187416 A1 | 8/2006 | Ouchi |
| 2001/0053023 A1 | 12/2001 | Kameno et al. | | 2006/0192960 A1 | 8/2006 | Renes et al. |
| 2002/0003661 A1 | 1/2002 | Nakai | | 2006/0215263 A1 | 9/2006 | Mi et al. |
| 2002/0015135 A1 | 2/2002 | Hanson | | 2006/0238715 A1 | 10/2006 | Hirata et al. |
| 2002/0040892 A1 | 4/2002 | Koyama et al. | | 2006/0268207 A1 | 11/2006 | Tan et al. |
| 2002/0122235 A1 | 9/2002 | Kurtz et al. | | 2007/0146644 A1 | 6/2007 | Mi et al. |
| 2002/0167727 A1 | 11/2002 | Hansen et al. | | 2007/0183035 A1 | 8/2007 | Asakawa et al. |
| 2002/0176166 A1 | 11/2002 | Schuster | | 2007/0195676 A1 | 8/2007 | Hendriks et al. |
| 2002/0181824 A1 | 12/2002 | Huang et al. | | 2007/0217008 A1 | 9/2007 | Wang et al. |
| 2002/0191286 A1 | 12/2002 | Gale et al. | | 2007/0223349 A1 | 9/2007 | Shimada et al. |
| 2003/0058408 A1 | 3/2003 | Magarill et al. | | 2007/0242187 A1 | 10/2007 | Yamaki et al. |
| 2003/0072079 A1 | 4/2003 | Silverstein et al. | | 2007/0242228 A1 | 10/2007 | Chen et al. |
| 2003/0081178 A1 | 5/2003 | Shimizu et al. | | 2007/0242352 A1 | 10/2007 | MacMaster |
| 2003/0081179 A1 | 5/2003 | Pentico et al. | | 2007/0297052 A1 | 12/2007 | Wang et al. |
| 2003/0117708 A1 | 6/2003 | Kane | | 2008/0037101 A1 | 2/2008 | Jagannathan et al. |
| 2003/0156325 A1 | 8/2003 | Hoshi | | 2008/0038467 A1 | 2/2008 | Jagannathan et al. |
| 2003/0161029 A1 | 8/2003 | Kurtz et al. | | 2008/0055549 A1 | 3/2008 | Perkins |
| 2003/0180024 A1 | 9/2003 | Edlinger | | 2008/0055720 A1 | 3/2008 | Perkins |
| 2003/0193652 A1 | 10/2003 | Pentico et al. | | 2008/0055721 A1 | 3/2008 | Perkins |
| 2003/0202157 A1 | 10/2003 | Pentico et al. | | 2008/0055722 A1 | 3/2008 | Perkins |
| 2003/0218722 A1 | 11/2003 | Tsao et al. | | 2008/0266662 A1 | 10/2008 | Perkins |
| 2003/0223118 A1 | 12/2003 | Sakamoto | | 2008/0278811 A1 | 11/2008 | Perkins |
| 2003/0223670 A1 | 12/2003 | Nikolov et al. | | 2008/0316599 A1 | 12/2008 | Wang et al. |
| 2003/0224116 A1 | 12/2003 | Chen et al. | | 2009/0040607 A1 | 2/2009 | Amako et al. |
| 2004/0008416 A1 | 1/2004 | Okuno | | 2009/0041971 A1 | 2/2009 | Wang et al. |
| 2004/0042101 A1 | 3/2004 | Wang | | 2009/0053655 A1 | 2/2009 | Deng et al. |
| 2004/0047039 A1 | 3/2004 | Wang et al. | | 2009/0109377 A1 | 4/2009 | Sawaki et al. |
| 2004/0047388 A1 | 3/2004 | Wang et al. | | 2010/0103517 A1 | 4/2010 | Davis et al. |
| 2004/0051928 A1 | 3/2004 | Mi | | 2010/0239828 A1 | 9/2010 | Cornaby |
| 2004/0070829 A1 | 4/2004 | Kurtz et al. | | 2010/0328768 A1 | 12/2010 | Lines |
| 2004/0071425 A1 | 4/2004 | Wang | | 2010/0328769 A1 | 12/2010 | Perkins |
| 2004/0095637 A1 | 5/2004 | Nikolov et al. | | 2011/0080640 A1 | 4/2011 | Kaida et al. |
| 2004/0120041 A1 | 6/2004 | Silverstein et al. | | 2011/0096396 A1 | 4/2011 | Kaida et al. |
| 2004/0125449 A1 | 7/2004 | Sales | | | | |
| 2004/0165126 A1 | 8/2004 | Ooi et al. | | FOREIGN PATENT DOCUMENTS | | |
| 2004/0169924 A1 | 9/2004 | Flagello et al. | | EP | 1239308 | 11/2002 |
| 2004/0174596 A1 | 9/2004 | Umeki | | JP | 56156815 | 12/1981 |
| 2004/0201889 A1 | 10/2004 | Wang et al. | | JP | 58-042003 | 3/1983 |
| 2004/0201890 A1 | 10/2004 | Crosby | | JP | 10028675 | 1/1989 |
| 2004/0218270 A1 | 11/2004 | Wang | | JP | 02-308106 | 12/1990 |
| 2004/0227994 A1 | 11/2004 | Ma et al. | | JP | 3005706 | 1/1991 |
| 2004/0233362 A1 | 11/2004 | Kashima | | JP | 04 366916 | 6/1991 |
| 2004/0240777 A1 | 12/2004 | Woodgate et al. | | JP | 4-12241 | 1/1992 |
| 2004/0258355 A1 | 12/2004 | Wang et al. | | JP | 4331913 | 11/1992 |
| 2005/0008839 A1 | 1/2005 | Cramer et al. | | JP | 5134115 | 5/1993 |

| | | |
|---|---|---|
| JP | 5341234 | 12/1993 |
| JP | 6138413 | 5/1994 |
| JP | 06-174907 | 6/1994 |
| JP | 7005316 | 1/1995 |
| JP | 7-146469 | 6/1995 |
| JP | 7294851 | 11/1995 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-268301 | 10/1998 |
| JP | 11-014814 | 1/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2003502708 | 1/2003 |
| JP | 2004157159 | 6/2004 |
| JP | 2004309903 | 11/2004 |
| JP | 2005151154 | 5/2005 |
| JP | 2005195824 | 7/2005 |
| JP | 2006047813 | 2/2006 |
| JP | 2006-133402 | 5/2006 |
| JP | 2006201540 | 8/2006 |
| KR | 10-2004-0046137 | 6/2004 |
| KR | 10-2005-0017871 | 2/2005 |
| WO | WO96/15474 | 5/1996 |
| WO | WO 99/59005 | 11/1999 |
| WO | WO 01/51964 | 7/2001 |
| WO | WO 02/21205 | 3/2002 |
| WO | WO 02/077588 | 10/2002 |
| WO | WO 03/069381 | 8/2003 |
| WO | WO 2004/019020 | 3/2004 |
| WO | WO2006/014408 | 2/2006 |
| WO | WO 2006/036546 | 4/2006 |

OTHER PUBLICATIONS

U.S. Appl. No. 13/075,470, filed Mar. 30, 2011, Mark Alan Davis.
U.S. Appl. No. 13/224,719, filed Sep. 2, 2011, Mark Alan Davis.
U.S. Appl. No. 12/879,315, filed Sep. 10, 2010, Raymond T. Perkins, notice of allowance issued Jul. 7, 2011.
U.S. Appl. No. 11/767,361, filed Jun. 22, 2007; Eric Gardner; office action issued Feb. 6, 2012.
U.S. Appl. No. 12/507,570, filed Jul. 22, 2009; Mark Alan Davis; office action issued Jan. 13, 2012.
Lloyd William Taylor, et al., Manual of Advanced Undergraduate Experiments in Physics, p. 302 (1959).
Lockbihler et al. "Diffraction from highly conducting wire grating of arbitrary cross-section." Journal of Modern Optics, 1993, vol. 40, No. 7, pp. 1273-1298.
Novak et al., "Far infrared polarizing grids for use at cryogenic temperatures." Applied Optics, Aug. 15, 1989/vol. 28, No. 15, pp. 3425-3427.
Auton et al, "Grid Polarizers for Use in the Near Infrared." Infrared Physics, 1972, vol. 12, pp. 95-100.
Stenkamp et al, "Grid polarizer for the visible spectral region." SPIE vol. 2213 pp. 288-296.
Auton, "Infrared Transmission Polarizers by Photolithography." Applied Optics Jun. 1967 vol. 6, No. 6, pp. 1023-1027.
Nordin et al., "Micropolarizer array for infrared imaging polarimetry." J. Op. Soc. Am. A. vol. 16 No. 5 , May 1999.
Bird et al., "The Wire Grid as a Near-Infrared Polarizer." J. Op. Soc. Am. vol. 50 No. 9 (1960).
Optics 9$^{th}$ Edition, pp. 338-339 (1980).
Whitbourn et al, "Phase shifts in transmission line models of thin periodic metal grids." Applied Optics Aug. 15, 1989 vol. 28, No. 15, pp. 3511-3515.
Li Li et al , "Visible broadband, wide-angle, thin-film multilayer polarizing beam splitter." Applied Optics May 1, 1996, vol. 35, No. 13, pp. 2221-2224.
Sonek et al., "Ultraviolet grating polarizers." J. Vac. Sci. Technol., 19(4), Nov./Dec. 1981, pp. 921-923.
Dainty, et al, "Measurements of light scattering by characterized random rough surface." Waves in Random Media 3 (1991).
DeSanto et al, "Rough surface scattering." Waves in Random Media 1 (1991).
Moshier et al. "The Corrosion and Passively of Aluminum Exposed to Dilute Sodium Sulfate Solutions." Corrosion Science vol. 27. No. 8 pp. 785-801 1987.
Scandurra, et al. "Corrosion Inhibition of Al Metal in Microelectronic Devices Assemble in Plastic Packages." Journal of the Electrochemical Society, 148 (8) B289-B292 (2001).
Takano, Kuniyoshi et al. "Cube polarizers by the use of metal particles in anodic alumina films." Applied Optics, vol. 33, No. 16, 3507-3512, Jun. 1, 1994.
Lopez et. al. "Wave-plate polarizing beam splitter based on a form-birefringent multilayer grating." Optics Letters, vol. 23, No. 20, pp. 1627-1629, Oct. 15, 1998.
Chen, J. et al. "Optimum film compensation modes for TN and VA LCDs." SID 98 Digest, pp. 315-318, 1998.
Richter, Ivan et al. "Design considerations of form birefringent microstructures." Applied Optics, vol. 34, No. 14, pp. 2421-2429, May 10, 1995.
Ho, G H et al. "The mechanical-optical properties of wire-grid type polarizer in projection display system." SID 02 Digest, pp. 648-651, 2002.
Kostal, Hubert, NanoTechnology "using advanced lithography to pattern nano-optic devices." www.solid-state.com, Sep. 2005, p. 26 and 29.
Kostal, Hubert "Nano-optics: robust, optical devices for demanding applications." Military & Aerospace Electronics, Jul. 2005, 6 pages.
Wang, Jian et al. "Free-Space nano-optical devices and integration: design, fabrication, and manufacturing." Bell Labs Technical Journal, 2005 pp. 107-127, vol. 10, No. 3.
Savas et al. "Achromatic interferometric lithography for 100-nm-period gratings and grids." Journal Vac. Sci. Technology B, Nov./Dec. 1995, pp. 2732-2735, vol. 13, No. 6.
Haisma et al. "Mold-assisted nanolithography: a process for reliable pattern replication." Journal Vac. Sci. Technology B, Nov./Dec. 1996, pp. 4124-4128, vol. 14, No. 6.
Wang et al. "High-performance large-area ultra-broadband (UV to IR) nanowire-grid polarizers and polarizing beam-splitters." Proc. of SPIE 2005, pp. 1-12, vol. 5931.
Wang et al. "Monolithically integrated isolators based on nanowire-grid polarizers." IEEE, Photonics Technology Letters, Feb. 2005, pp. 396-398, vol. 17, No. 2.
Deng et al. "Wideband antireflective polarizers based on integrated diffractive multilayer microstructures." Optics Letters, Feb. 1, 2006, pp. 344-346, vol. 31 , No. 3.
Deng et al. "Wideband antireflective polarizes based on integrated diffractive multilayer microstructures." Optics Letters, Feb. 1, 2006, pp. 344-346, vol. 31, No. 3.
Chen, et al. "Novel polymer patterns formed by lithographically induced self-assembly (LISA).", American Chemical Society, Jan. 2005, pp. 818-821, vol. 21, No. 3.
Baur, "A new type of beam splitting polarizer cube." Meadowlark Optics, 2005, pp. 1-9.
Zhang et al., "A broad-angle polarization beam splitter based on a simple dielectric periodic structure." Optices Express, Oct. 29, 2007, 6 pages, vol. 15, No. 22.
Robinson et al., "Wide Field of View Compensation Scheme for Cube Polarizing Beam Splitters." SID 03 Digest, pp. 1-4, www.colorlink.com.
Pentico, Eric et al., "New, High Performance, Durable Polarizers for Projection Displays." SID 01 Digest, 2001, pp. 1287-1289.
Brummelaar et al., "Beam combining optical components," Chara Technical Report, Jan. 5, 1998, pp. TR61-1 to TR 61-17, No. 61.
Fritsch, et al., "A liquid-crystal phase modulator for large-screen projection." IEEE, Sep. 1989, pp. 1882-1887, vol. 36, No. 9.
DeGuzman et al., "Stacked subwavelength gratings as circular polarization filters." Applied Optics, Nov. 1, 2001, pp. 5731-5737, vol. 40, No. 31.

Tyan et al., "Polarizing beam splitter based on the anisotropic spectral reflectivity characteristic of form-birefringent multilayer gratings." Optics Letters, May 15, 1996, pp. 761-763, vol. 21, No. 10.

Maystre & Dainty, Modern Analysis of Scattering Phenomena Proceeding from International Workshop held at Domaine deTournon, Aix en Provence, France Sep. 5-8, 1990.

Wang, et al., "Innovative High-Performance Nanowrie-Grid Polarizers and integrated Isolators," IEEE Journal of Selected Topics in Quantum Electronics, pp. 241-253, vol. 11 No. 1 Jan./Feb. 2005.

U.S. Appl. No. 11/767,361, filed Jun. 22, 2007; Eric Gardner; office action issued May 24, 2012.

* cited by examiner

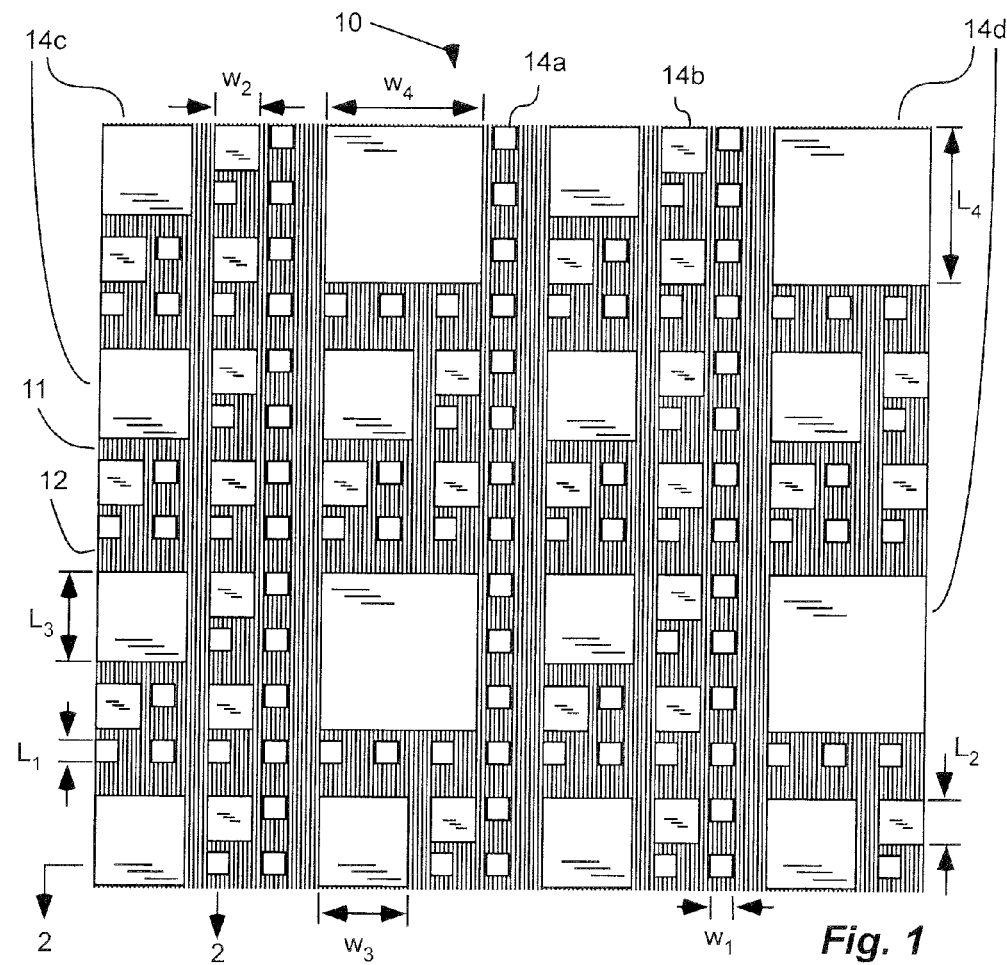
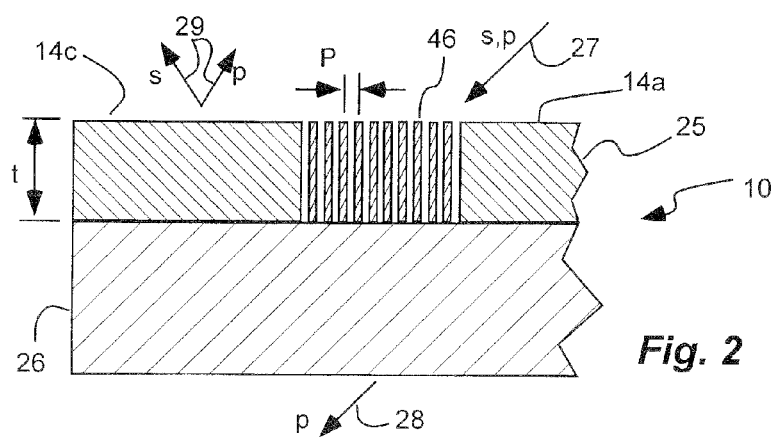
Fig. 1
Fig. 2

NANO FRACTAL DIFFUSER

RELATED APPLICATION(S)/PATENT(S)

This is related to U.S. patent application Ser. No. 11/669,765, filed Jul. 19, 2007, which is hereby incorporated herein by reference in its entirety.

This is related to U.S. Pat. Nos. 6,081,376 and 6,348,995, which are hereby incorporated herein by reference in their entirety.

BACKGROUND

1. Field of the Invention

The present invention relates generally to optical diffusers including diffusive wire-grid polarizers.

2. Related Art

Wire-grid polarizers have been developed that are capable of polarizing light, i.e. separating one polarization orientation from another, by transmitting one polarization orientation and reflecting the other. Wire grid polarizers are a periodic structure of conductive elements with a length greater than the wavelength and a period (p) less than half the wavelength of the incident light, or $p \leq \lambda/2$. Wire grid polarizers have been proven to be effective for visible light (~300-700 nm, or ~0.3-0.7 microns or µm) and their use demonstrated as polarizers and beam splitters in optical imaging systems. Typically, however, the reflection from, and the light passing through, such wire-grid polarizers, is specular, or mirror-like.

Wire-Grid polarizers are different from diffraction gratings, which are a periodic structure of dielectric material with a period (p) greater than half the wavelength (λ) of incident light, or $p \geq \lambda/2$. The diffraction grating scatters the incident light at discrete angles or directions in accordance with $m\lambda = p \sin\Theta$, where m is the order and $\Theta$ is the angle with respect to normal from the diffraction grating. Thus, different wavelengths are reflected or scattered at different angles.

Various different types of wire-grid polarizers have been proposed that include patterning the wires incurved lines, rather than strait lines; or forming the wires in a lattice structure with reinforcing members. See US Patent Application Publication US 2002/0167727 A2; and U.S. Pat. Nos. 6,972,906; 7,009,768; and PCT Application PCT/US2005/032656 (WO 2006/036546).

Other types of wire-grid polarizers have been proposed to diffusely reflect incident light that include contoured surfaces at different angles. See U.S. Pat. Nos. 6,081,376 and 6,348,995. Such polarizers, however, still specularly reflect, only from within several differently oriented textured surfaces.

Sometimes it is desirable to reflect all incident light or transmit most or all incident light in a diffuse manner. In this situation a diffuser is desired, but not a polarizing diffuser. One example of this situation would be a thermal window with a metallic film. Without a diffuser, a specular reflection would result from the building windows. Another need for diffuse light may be in an LCD display or a projector system.

SUMMARY OF THE INVENTION

It has been recognized that it would be advantageous to develop a wire-grid polarizer for polarizing incident light by diffusely transmitting one polarization orientation and diffusely reflecting the other polarization orientation.

The invention provides a diffusive wire grid polarizer device including a common layer of conductive material with a uniform thickness disposed on a substrate. The layer defines an array of discrete, broad facets arrayed across the substrate. The facets have dimensions greater than half the wavelength of incident light. The facets substantially diffract both the s-polarized light and a portion of the p-polarized light incident on the facets. The facets also diffract the light that passes through the polarizer, which is comprised mostly of p-polarized light. In addition, the layer defines a wire-grid including an array of elongated parallel conductive wires. The array of wires fills spaces between the facets. The array of wires has a period less than half the wavelength of incident light to polarize the light by substantially reflecting light having an s-polarization orientation and substantially transmitting a portion of the light having a p-polarization orientation.

It has also been recognized that it would be advantageous to develop a non-polarizing diffuser to either transmit or reflect light diffusively. Another embodiment of the invention provides a diffuser device including at least one top layer and a bottom layer. The top layer(s) define at least one array of discrete, broad facets arrayed across the bottom layer. The facets have dimensions greater than half the wavelength of incident light. The facets substantially diffract the incident light. The diffuser device may transmit some or substantially all of the incoming light or it may reflect all of the incoming light in a diffuse manner.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a schematic top view of a diffusive wire-grid polarizer in accordance with an embodiment of the present invention;

FIG. 2 is a schematic cross-sectional side view of the diffusive wire-grid polarizer of FIG. 1 taken along line 2-2 in FIG. 1;

DETAILED DESCRIPTION OF EXAMPLE EMBODIMENTS

Figure 3:
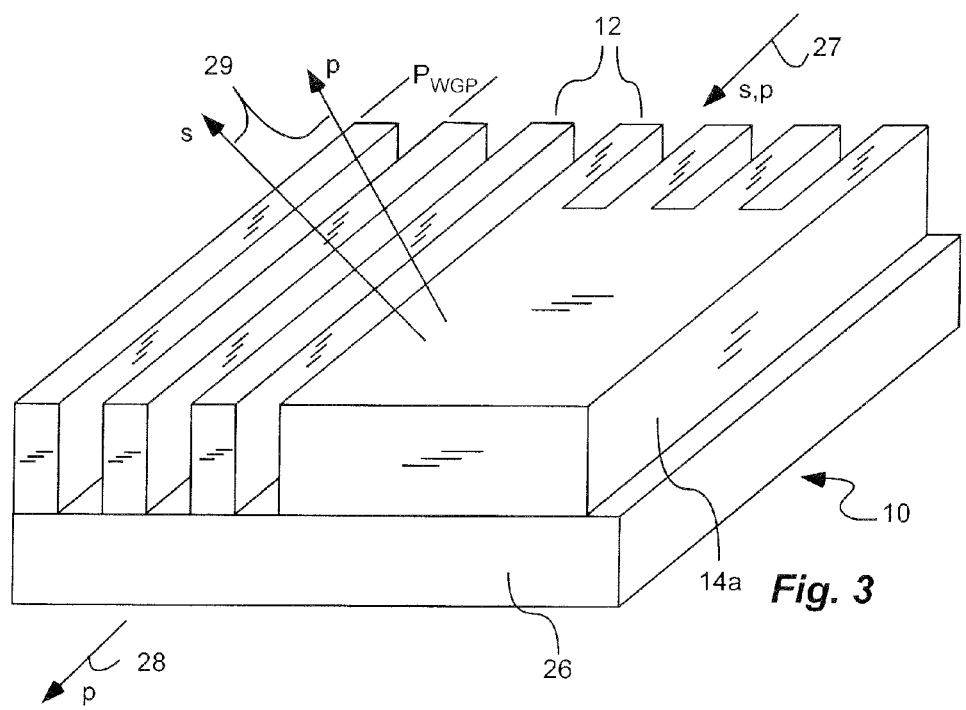
FIG. 3 is a schematic partial perspective view of the diffusive wire-grid polarizer of FIG. 1.
Figure 4F:
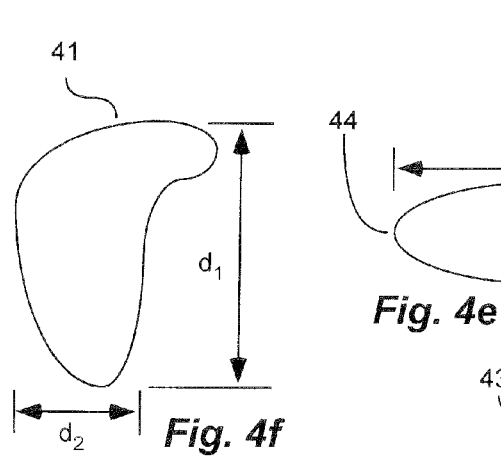
FIGS. 4a-f are schematic top views of various shaped facets.
Figure 4E:
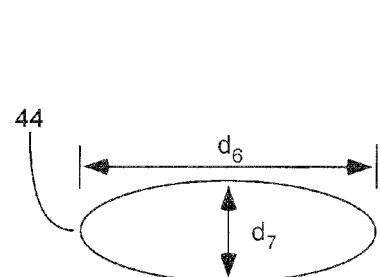
Figure 4A:
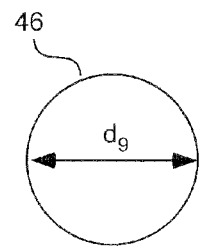
Figure 4B:
Figure 4C:
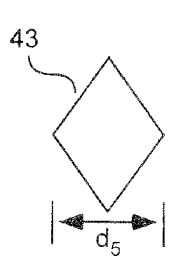
Figure 4D:
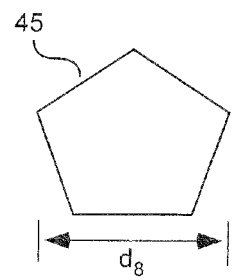

As illustrated in FIGS. 1-3, a diffusive wire-grid polarizer (WGP), indicated generally at 10, in an example implementation in accordance with the invention is shown. The diffusive WGP of the present invention can be used in situations in which non-specular, or non-mirror like, reflection of substantially one polarization orientation (namely a diffuse reflected beam 29 of s-polarization orientation) is desired of an incident beam 27. The diffusive WGP of the present invention can also be used in situations in which non-specular, or non-mirror like, transmission of substantially one polarization orientation (namely a diffuse transmitted beam 28 of p-polarization orientation) is desired of an incident beam 27. In such a situation, diffuse reflection or diffuse transmission may be more important than polarization contrast because the diffuse reflected beam 29 may also include a substantial amount of p-polarization orientation in addition to the s-polarization orientation. The incident beam 27 can be unpolarized, and can be visible light (or have one or more wavelengths in the range of ~300-700 nm, or ~0.3-0.7 microns or μm). Alternatively, the incident beam can be infrared or ultraviolet. In this patent application, light means ultraviolet, visible, or infrared.

The diffusive WGP 10 can include a substrate 26, such as glass, or another material that is substantially transparent to the incident light beam 27. Substrate 26 can be a single layer or can be multiple layers, with each layer made of the same material as, or different materials than, the other layers. Disposed on or over the substrate is a layer 25 of conductive material, such as aluminum or silver. The layer 25 can be deposited directly on the substrate. Alternatively, other layers can be disposed between the substrate 26 and the layer 25 of conductive material. The layer 25 can have a uniform and constant thickness t, and disposed over essentially the entire substrate.

The layer 25 can be patterned (such as by etching select areas) to form an array of facets 14a-d arrayed across the substrate. The facets can be made of multiple sizes in order to optimize light diffraction. The facets 14a-d extend essentially across the entire substrate with spaces or gaps 11 therebetween. The facets can be arranged in a fractal pattern. "Fractal" means geometrical structures whose shape appears to be the same regardless of the level of magnification used to view them. The facets 14a-d can have widths $w_{1-4}$ or diameters and lengths $L_{1-4}$ greater than a wavelength λ of incident light, or greater than half the wavelength of incident light (w>λ/2 and L>λ/2, where w is a width or diameter or dimension of the facets transverse to the wires, and L is a length of the facets transverse to the width). Thus, the facets substantially diffract both the s-polarized light and the p-polarized light incident on the facets, or the light having s-polarization orientation and p-polarization orientation. A majority or substantially all of the light having s-polarization orientation will be diffracted, or diffusely reflected; while a portion of the light having p-polarization orientation will be transmitted, or diffusely transmitted. The type of fractal pattern used and material of the layer 25 affect the amount of p-polarized light that is transmitted.

In addition, layer 25 can be patterned to form a wire-grid including an array of elongated parallel conductive wires 12 filling the spaces 11 between the facets 14a-d. Thus, the array of wires 12 extends across essentially the entire substrate. The facets 14a-d and the array of wires 12 can be formed together with each facet integral with the plurality of wires. The array of facets 14a-d interrupt and are interspersed through the array of wires 12. The plurality of facets interrupts the array of wires, and share a common layer.

The array of wires 12 has a period P less than half the wavelength λ/2 of incident light ($P_{WGP}$<λ/2, where $P_{WGP}$ is the period of the wires, and λ is the wavelength of light incident on the wires). Thus, the array of wires at least partially polarizes the incident light 27 by substantially reflecting light 29 having an s-polarization orientation and substantially transmitting light 28 having a p-polarization orientation.

The array of wires and array of facets can be formed by lithography.

The facets 14a-d can have at least two different sizes with at least two different surface areas, such as four different facets with four different sizes and four different surface areas, as shown. The facets can have rectilinear shapes, such as square with the width and length of each facet being essentially equal, or on the same order of magnitude. As shown in FIG. 4a-f, the facets can also be circular 46, triangular 42, diamond shaped 43, polygonal 45, elliptical 44, irregular shaped 41, or other shape. Different shapes may be selected for improved optical performance or ease of manufacturability. Facet dimensions $d_{1-9}$ are greater than a wavelength λ of incident light, or greater than half the wavelength of incident light (d>λ/2). Although most figures show square shaped facets, any shaped facet may be used in all invention embodiments. Although most figures show two to four different sized facets, any number of different sized facets may be used in all invention embodiments.

Figure 5:
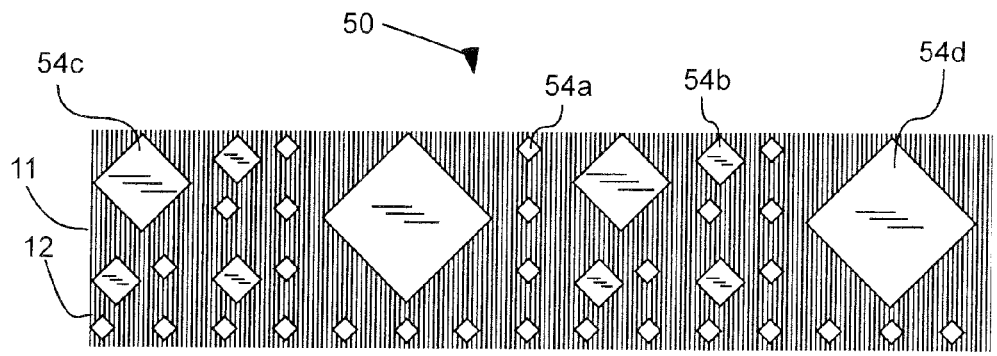
FIG. 5 is a schematic top view of a diffusive wire-grid polarizer in accordance with an embodiment of the present invention.

FIG. 1 shows square shaped facets 14a-d, with widths $w_{1-4}$ transverse to the wires and lengths $L_{1-4}$ transverse to the width, arranged in a fractal pattern. FIG. 5 shows a diffusive WGP, indicated generally at 50, in another example implementation in accordance with the invention. This diffusive WGP has square shaped facets 54a-d, arranged in a fractal pattern. While the width of the square shape is not orthogonal to the wires, and the length of the square shape is not parallel to the wires, the square shape has a diameter or dimension transverse to the wires that is greater than a wavelength λ of incident light, or greater than half the wavelength of incident light.

Figure 6:
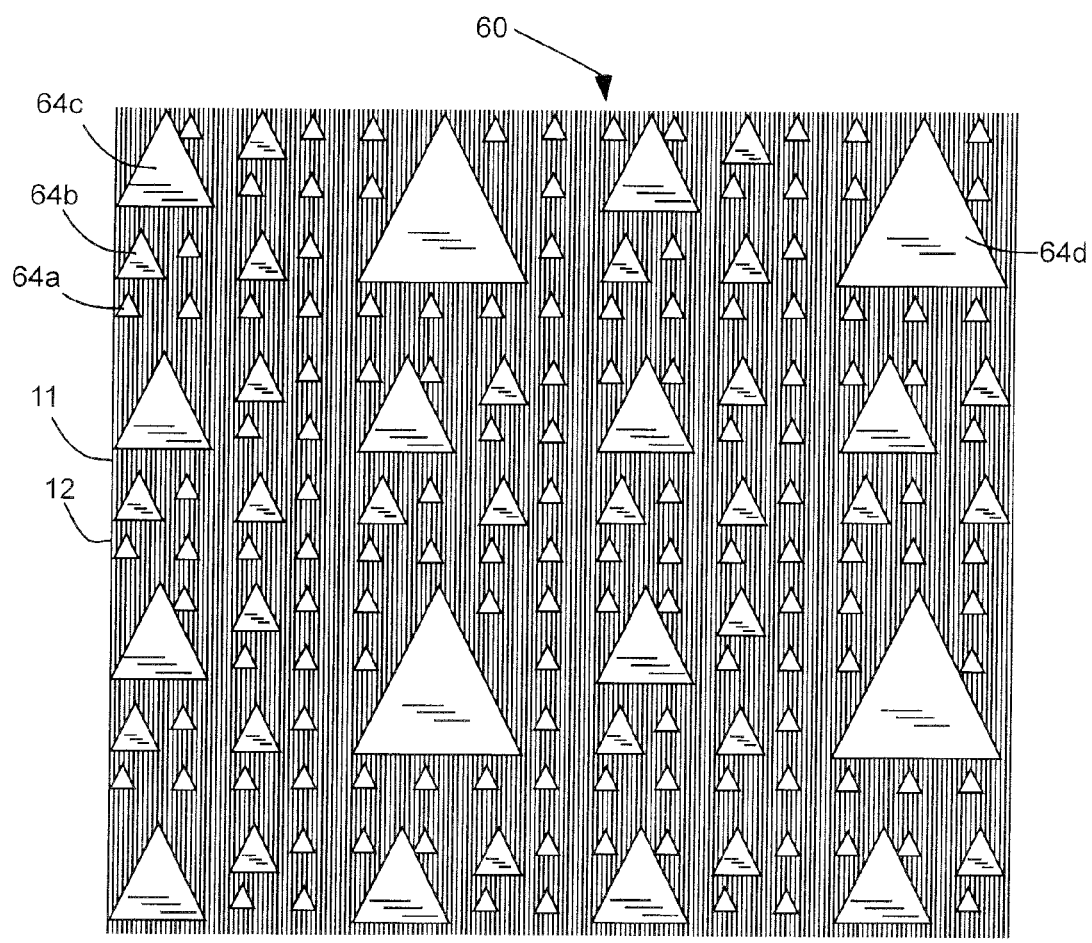
FIG. 6 is a schematic top view of a diffusive wire-grid polarizer in accordance with an embodiment of the present invention.

FIG. 6 shows a diffusive WGP, indicated generally at 60, in another example implementation in accordance with the invention. This diffusive WGP has triangular shaped facets 64a-d, arranged in a fractal pattern. As described above, the triangular shaped faces have a diameter or dimension (such as $d_3$ or $d_4$ of FIG. 4) transverse to the wires that is greater than a wavelength λ of incident light, or greater than half the wavelength of incident light. Different fractal patterns may be selected for improved optical performance or ease of manufacturability.

Figure 7:
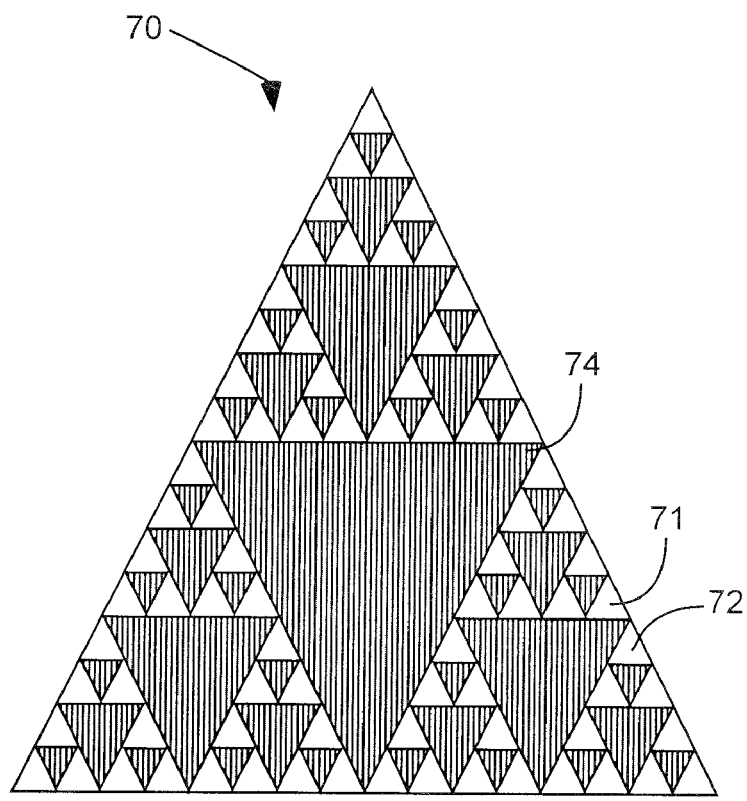
FIG. 7 is a schematic top view of a diffusive wire-grid polarizer in accordance with an embodiment of the present invention.
Figure 8:
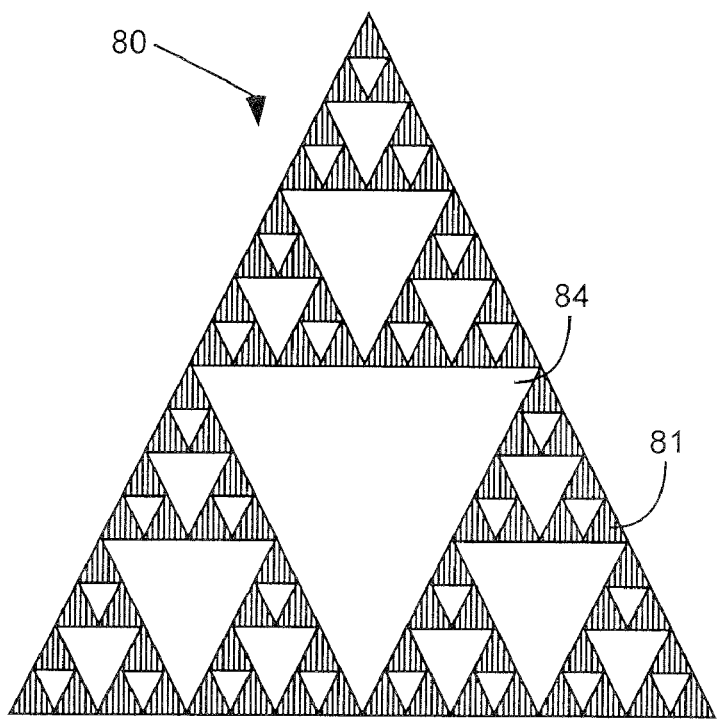
FIG. 8 is a schematic top view of a diffusive wire-grid polarizer in accordance with an embodiment of the present invention.

As illustrated in FIGS. 7-8, indicated generally at 70 and 80 respectively, fractal patterns different from that shown in FIGS. 1 and 6 may be used. In the example of FIG. 7, the wire gridded area 74 of the diffusive WGP 70 comprises a fractal pattern and the area between the fractal pattern 71 comprises facets 72. The facets 72 form distinct groups or areas 74 in the array of wires which include or define the fractal pattern, and can include at least sixteen facets with four different sizes arranged in a fractal pattern. The facets 72 can have the same shape. Alternatively, as shown in FIG. 8, the facets 84 of the diffusive WGP 80 may comprise a fractal pattern and the area between the fractal pattern 81 may comprise a wire grid. Optical properties, such as transmissivity or extinction, may be optimized by selection of the wire grid or facets to form a fractal pattern. In all embodiments of this invention, the facets or the wire grid may comprise a fractal.

Figure 9:
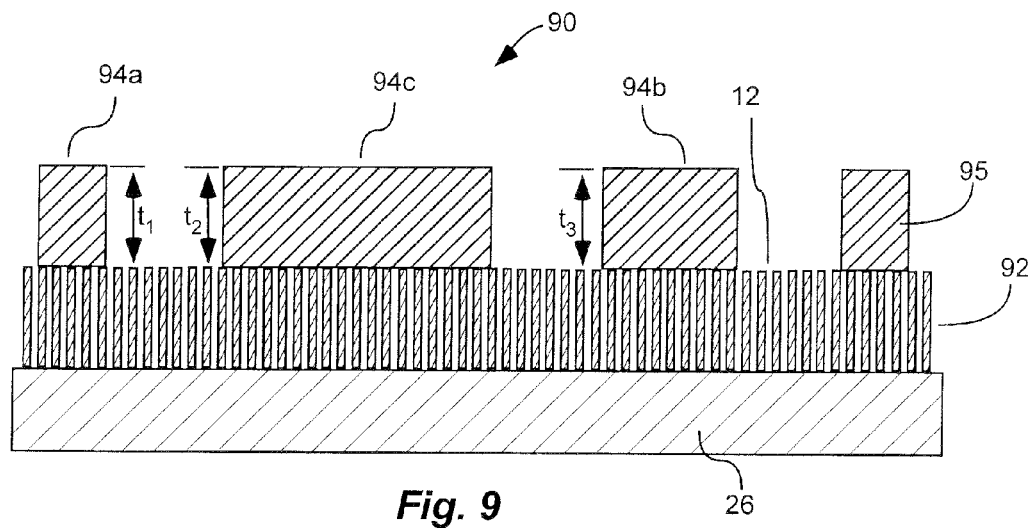
FIG. 9 is a schematic cross-sectional side view of a diffusive wire-grid polarizer in accordance with an embodiment of the present invention.

As illustrated in FIG. 9, another diffusive wire-grid polarizer, shown generally at 90, has facets 94a-c disposed over a wire grid layer 92 with an array of elongated parallel conductive wires as described above. The facets 94a-c can be any material with the desired optical properties. Use of a transparent material for facets 94a-c can result in higher transmission of the p-polarized light. In this embodiment, the wire grid layer 92 can extend over all, or substantially all, of the surface of the substrate 26. To make such a device, a first layer 92 may be added to a substrate 26 by sputtering, chemical vapor deposition, evaporation, or other similar method. The first layer 92 may be patterned and etched to form the wire grid. Another layer 95 may be added on top of the wire grid layer by sputtering, chemical vapor deposition, evaporation, or other similar method. The top layer 95 may be patterned and etched to form the facets 94a-c. The facets may comprise a fractal pattern, as described above. The exposed wire grid, in areas where there are no facets, may comprise a fractal pattern, as described above. Different facets may all be etched to the same depth such that the facet thicknesses $t_{1-3}$ are the same, as shown in FIG. 9. Different facets may be etched to different depths such that the facet thicknesses $t_{1-3}$ are not the same. This may be done by use of separate masking and etching steps for different depth facets. Facets of different sizes or shapes help to create diffuse transmitted or reflected light. Facets of different depths also create diffuse transmitted or reflected light because the light travels through different thicknesses $t_{1-3}$ of material.

Figure 10:
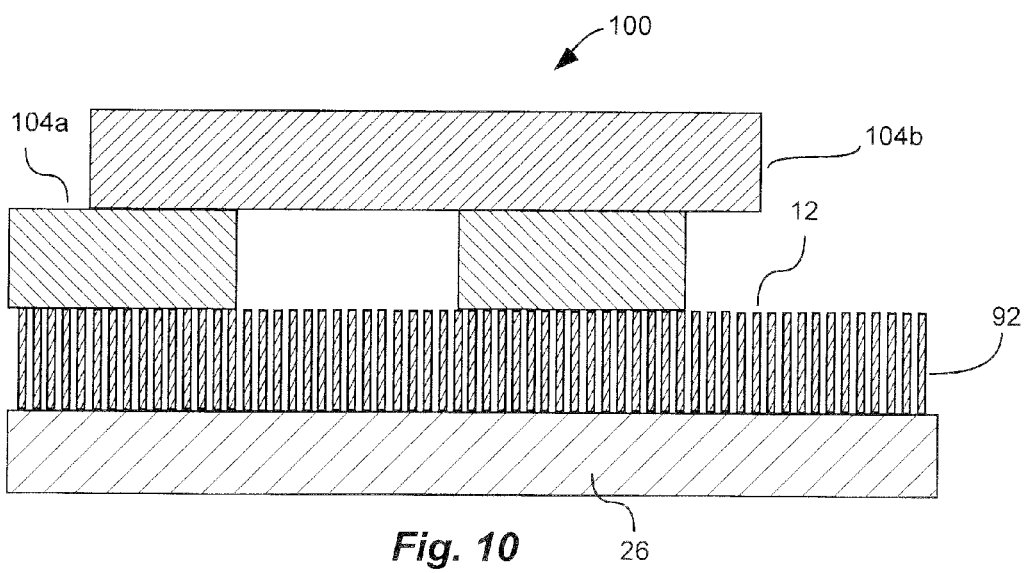
FIG. 10 is a schematic cross-sectional side view of a diffusive wire-grid polarizer in accordance with an embodiment of the present invention.

As illustrated in FIG. 10, another diffusive wire-grid polarizer, shown generally at 100, has facets 104a-b disposed over the wire grid layer 92 in multiple layers. The facets 104a-b may be any material with the desired optical properties. There may be more than two layers of facets. All layers may be the same material or the layers of facets may be made of different materials. Multiple layers can provide improved light control and improved wavelength specificity. To make such a device, additional layer deposition, patterning, and etching steps can be used following making the basic structure 90 of FIG. 9.

Figure 11:
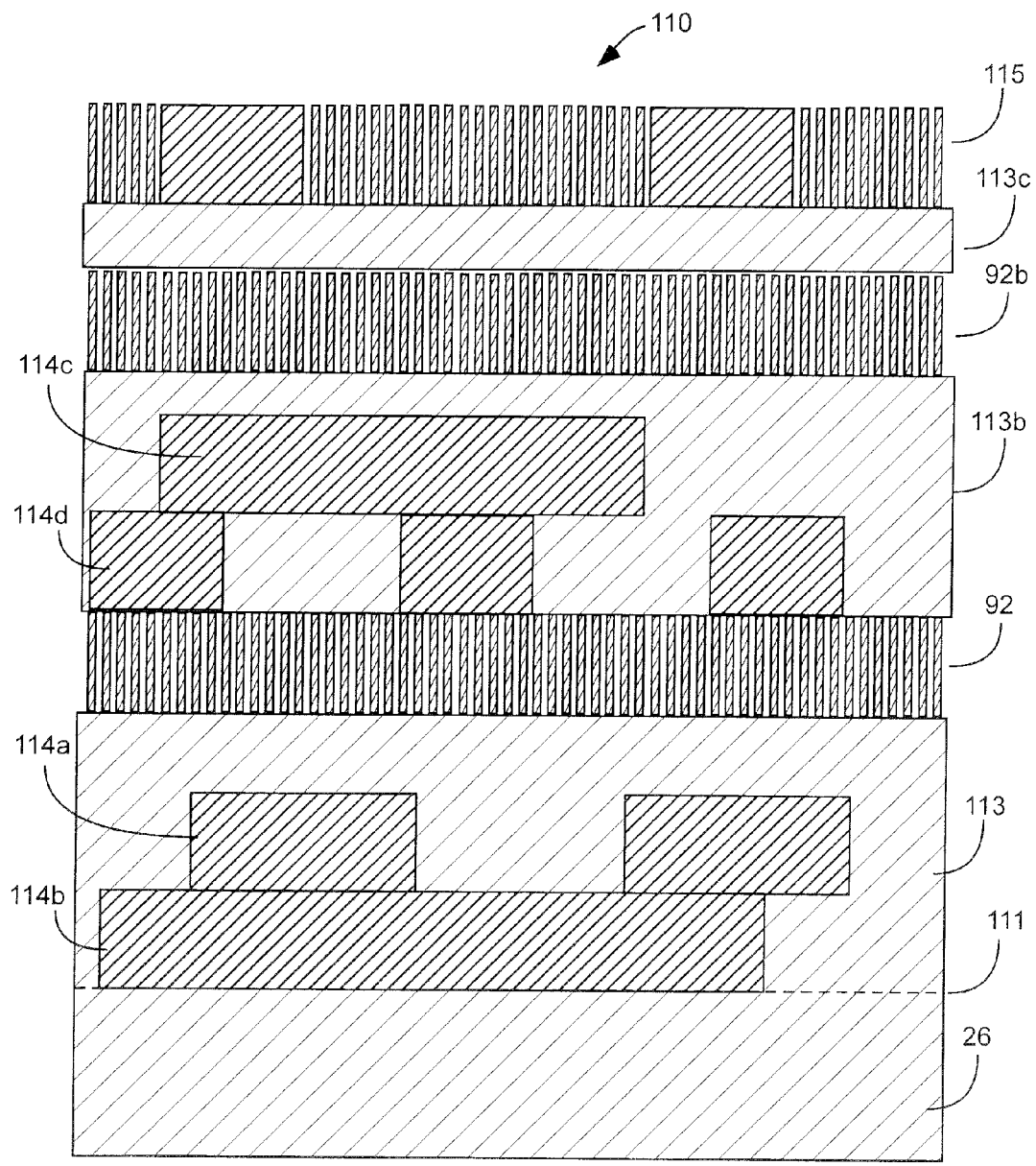
FIG. 11 is a schematic cross-sectional side view of a diffusive wire-grid polarizer in accordance with an embodiment of the present invention.

As illustrated in FIG. 11, another diffusive wire-grid polarizer, shown generally at 110, has facets 114a-b disposed below the wire grid layer 92. To make such a device, a lower facet layer or multiple lower facet layers are added on top of the substrate 26 by deposition, patterning, and etching steps. Another layer 113 is then added on top of the facets. Layer 113 can be the same as the substrate 26 or can be a different material as shown by dividing line 111. A wire grid layer 92 and facet layers 114c-d may be added on top of layer 113. In a similar fashion, other layers 113b-c may be added on top to allow added wire grid layers 92b, facet layers, and/or combined facet plus wire grid layers 115. The facets 114a-d may be any material with the desired optical properties. This stacking of wire grid layers 92b, facet layers, and/or combined facet plus wire grid layers may apply to other embodiments of the invention. Multiple layers can provide improved light control and improved wavelength specificity.

Figure 12:
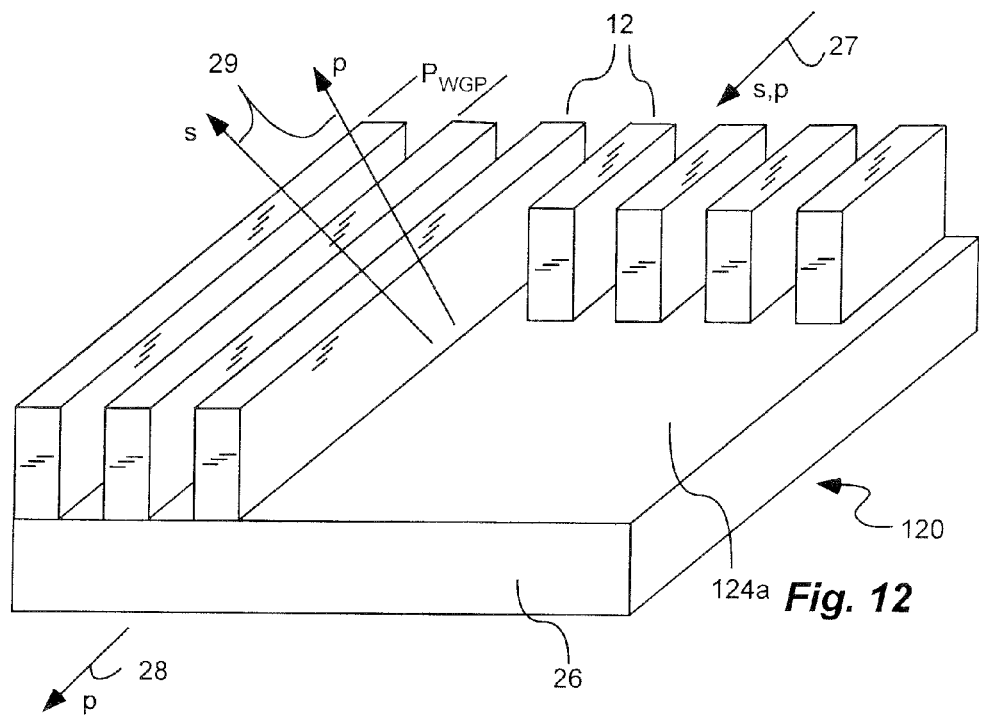
FIG. 12 is a schematic partial perspective view a diffusive wire-grid polarizer in accordance with an embodiment of the present invention.

As illustrated in FIG. 12, another diffusive wire-grid polarizer, shown generally at 120, has facets 124a created by etching away facet areas rather than by masking facet areas such as in FIGS. 1-2. In other embodiments of this invention, facets may also be created by etching the desired facet area and masking between facet areas. Thus, areas of the upper surface of the substrate without wires 12 can form the facets 124a. This embodiment can have an advantage of improved transmissivity.

Figure 13:
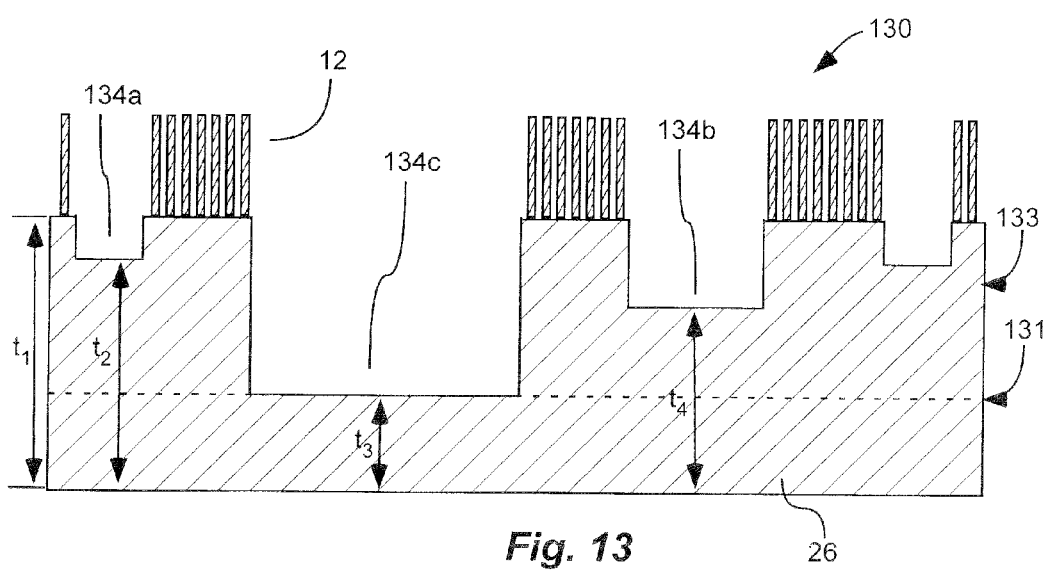
FIG. 13 is a schematic cross-sectional side view of a diffusive wire-grid polarizer in accordance with an embodiment of the present invention.

As illustrated in FIG. 13, another diffusive wire-grid polarizer, shown generally at 130, has facets 134a-c formed by etching into the substrate 26 or into a layer 133 on top of the substrate. Layer 133 may be the same as the substrate 26 or may be a separate material separated at dashed line 131. Different facets may all be etched to the same depth (not shown but such that the etch depths or substrate thicknesses $t_{2-4}$ at the facets are the same). Different facets may be etched to different depths, as shown, such that etch depths or substrate thicknesses $t_{2-4}$ at the facets are not the same. This may be done by use of separate masking and etching steps for different depth facets. Facets of different sizes or shapes help to create diffuse transmitted or reflected light. Facets of different depths also create diffuse transmitted or reflected light because the light travels through different thicknesses $t_{1-4}$ of material.

Figure 14:
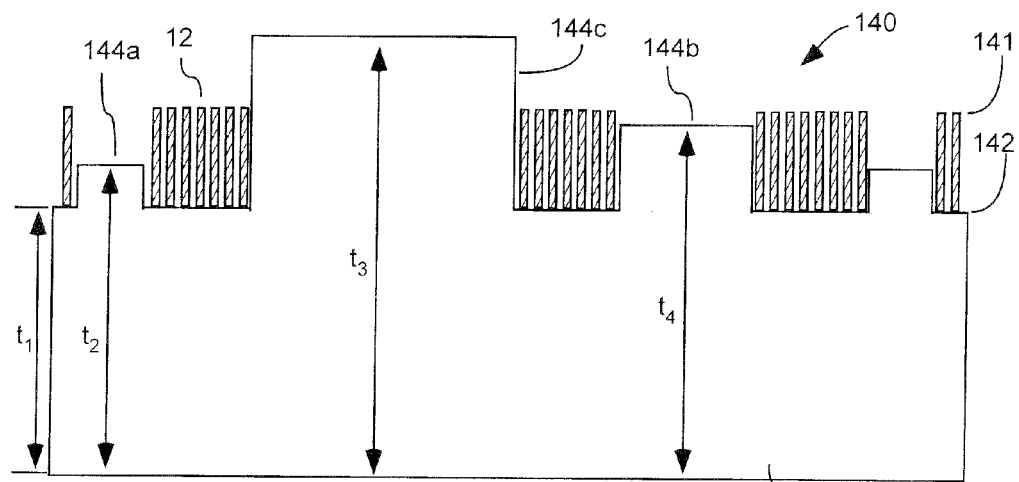
FIG. 14 is a schematic cross-sectional side view of a diffusive wire-grid polarizer in accordance with an embodiment of the present invention.

As illustrated in FIG. 14, another diffusive wire-grid polarizer, shown generally at 140, has thicknesses $t_{2-4}$ of the substrate 26 beneath the facets 144a-c that are thicker than the thickness $t_1$ of the substrate beneath the wire grid. This polarizer may be created by separate pattern and etch steps. For example, one pattern and etch step may be used to create facets of the thickness of facet 144b. A different pattern and etch step may be used to etch to the top of the desired wire grid 141. Another pattern and etch step may then be used to etch down to level 142 to create the wire grid 12. Facets of different thicknesses, as shown in FIGS. 13 & 14 may be used with other embodiments of the invention. Facets of different depths also create diffuse transmitted or reflected light because the light travels through different thicknesses $t_{1-4}$ of material.

Figure 15:
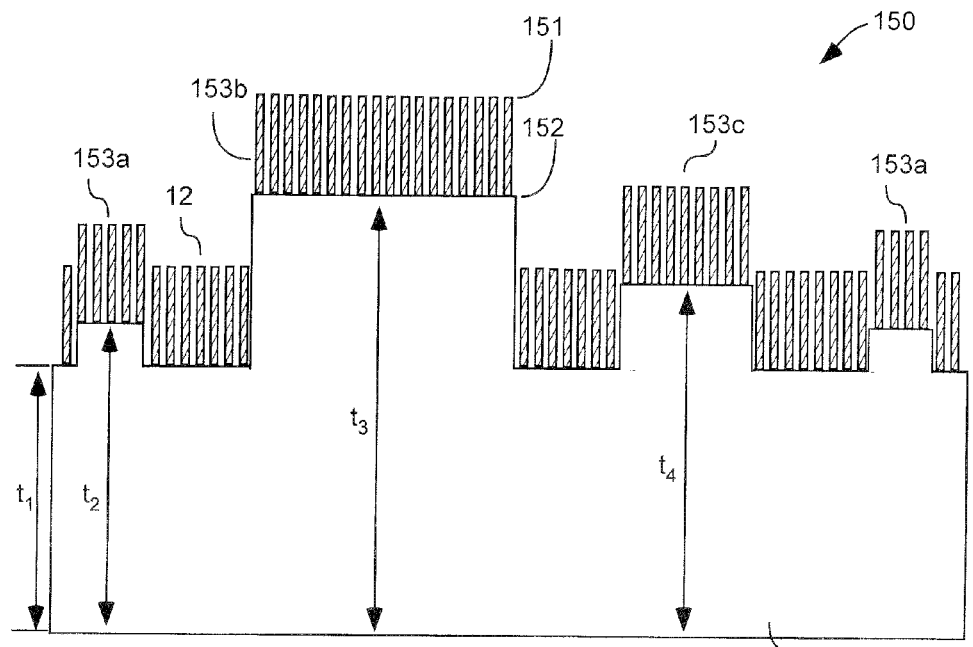
FIG. 15 is a schematic cross-sectional side view of a diffusive wire-grid polarizer in accordance with an embodiment of the present invention.

As illustrated in FIG. 15, another diffusive wire-grid polarizer, shown generally at 150, has a wire grid 153a-c disposed over facets in addition to the areas between the facets. This polarizer may be created by separate pattern and etch steps. For example, one pattern and etch step may be used to etch to the top of the desired wire grid 151. Another pattern and etch step may then be used to etch down to level 152 to create the wire grid 153b. Wire grids may be disposed over the facets of other invention embodiments. Use of wire grid over the facets can improve polarization contrast.

All of the previously described embodiments may be non-polarizing diffusers instead of diffusive wire grid polarizers through use of a non polarizing material, such as a non-conductive material, to make the wire grid layer. Alternatively, the following described embodiments are alternative non-polarizing diffusers.

Figure 16:
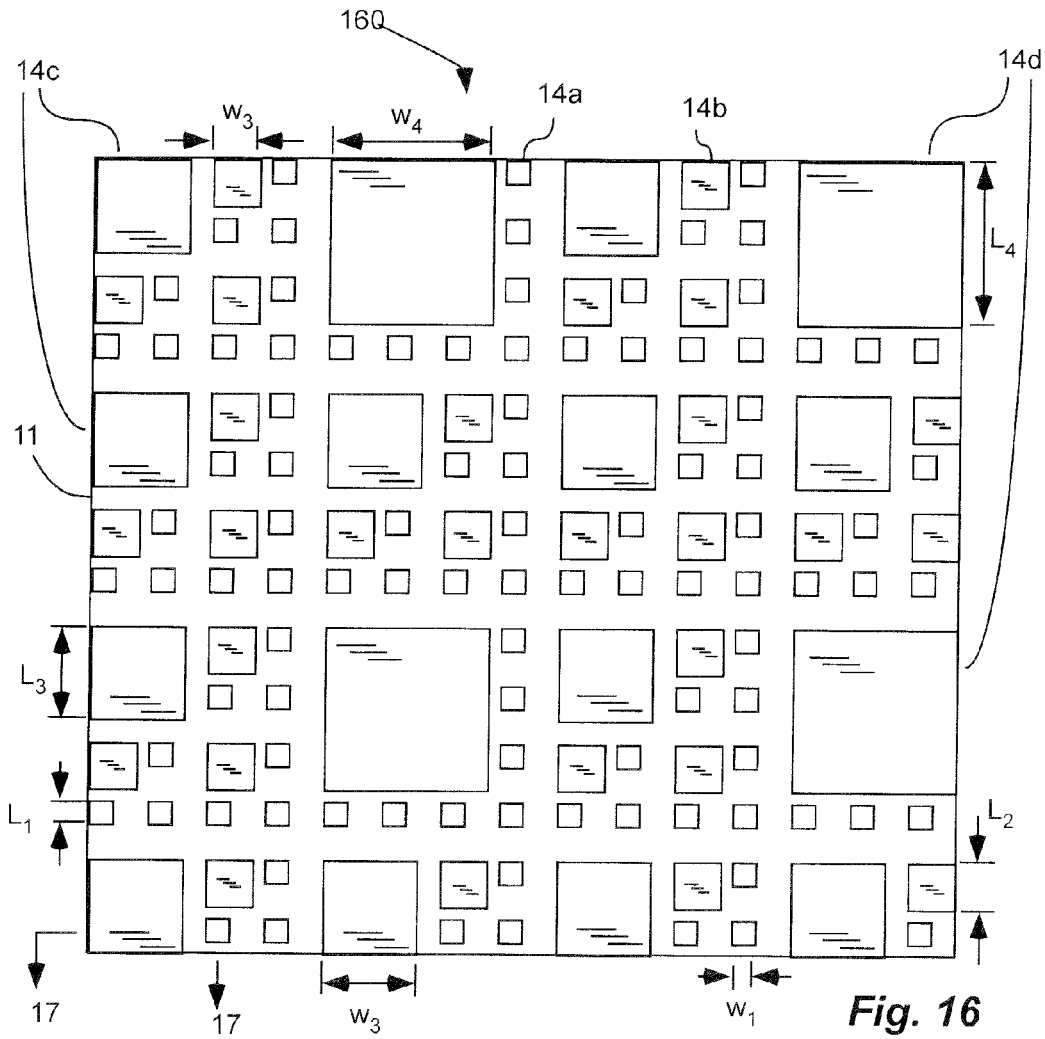
FIG. 16 is a schematic top view of a diffuser in accordance with an embodiment of the present invention.
Figure 17:
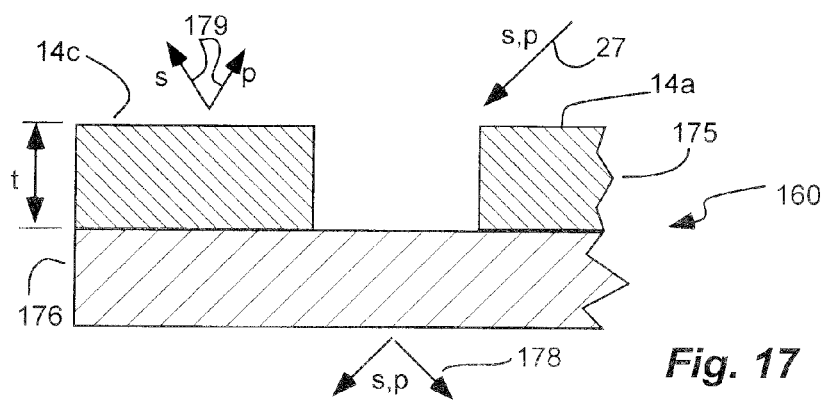
FIG. 17 is a schematic cross-sectional side view of the diffuser of FIG. 16 taken along line 17-17 in FIG. 16.

As illustrated in FIGS. 16-17, a diffuser, shown generally at 160, has facets used to create a non-polarizing diffuser. This embodiment may be useful if diffuse, non-polarized light is desired. A diffuser has a substrate 176 which may be made of materials that are, or are not, transparent to the incoming light 27. If the substrate is not transparent (or is opaque), then substantially all of the incoming light 27 can be reflected diffusely 179. If the substrate is transparent, then some of the incoming light can be reflected diffusely 179 and some or substantially all can be transmitted diffusely 178. The reflected and transmitted light will not be polarized. To make this device 160, facet layer 175 is etched completely between the facets 11 rather than patterned to form wire grids. Because polarization is not desired, facet layer 175 can be substantially any material that will provide the desired optical properties. Facet layer 175 and the substrate 176 can be the same material or may be different materials. Facet layer 175 can be deposited directly on the substrate 176. Alternatively, other layers can be disposed between the substrate 176 and layer 175.

Figure 18:
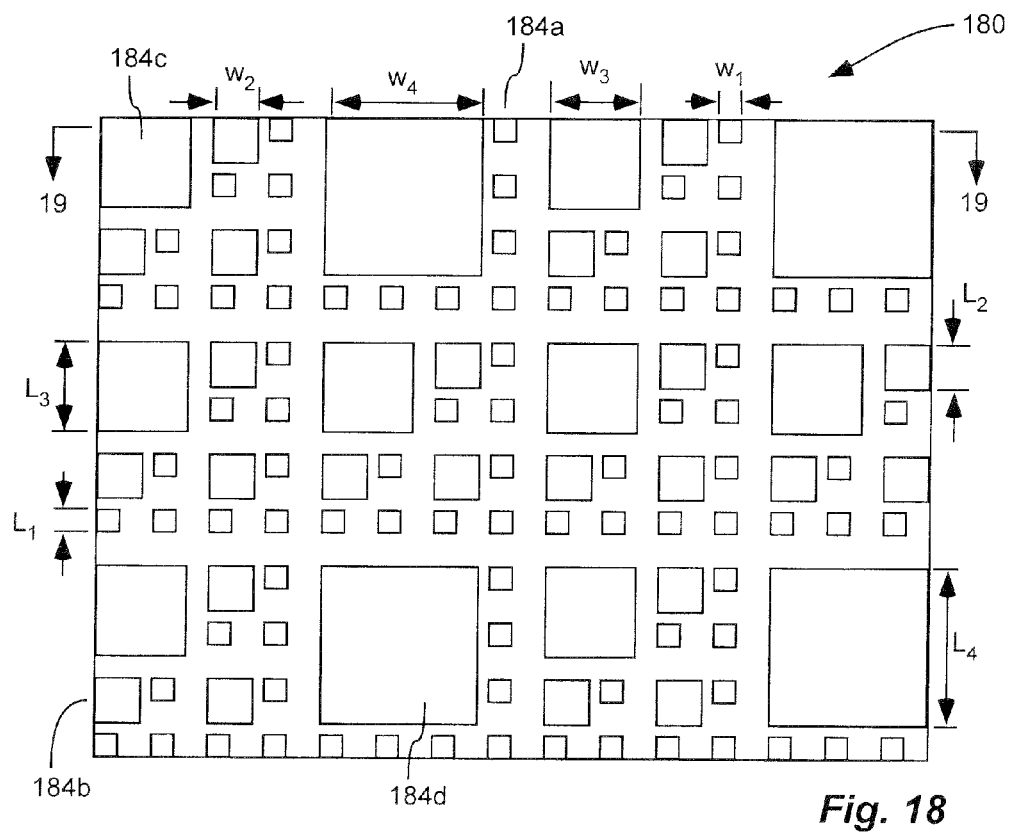
FIG. 18 is a schematic top view of a diffuser in accordance with an embodiment of the present invention.
Figure 19:
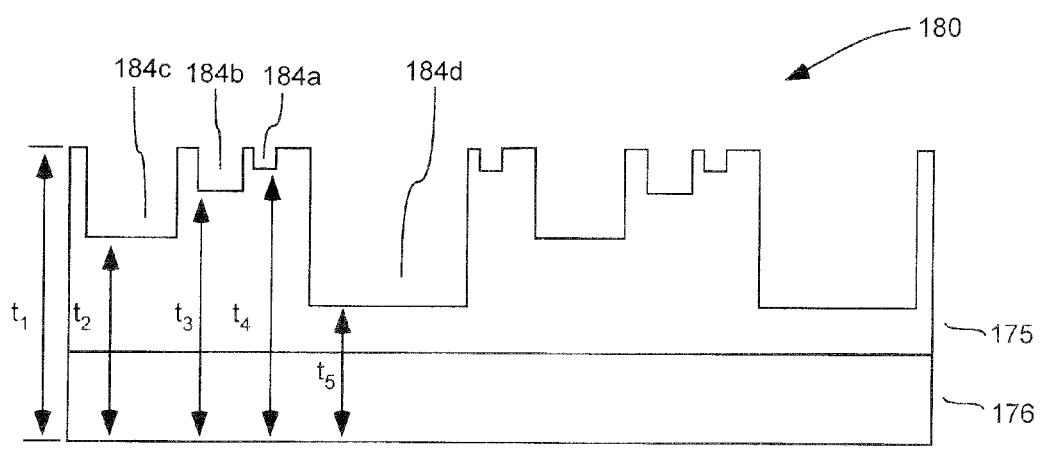
FIG. 19 is a schematic cross-sectional side view of the diffuser of FIG. 18 taken along line 19-19 in FIG. 18.

As illustrated in FIGS. 18-19, the facets 184a-d of another diffuser 180 are the locations that are cut into a layer or substrate rather than raised areas which were masked during etching. Facet layer 175 and substrate (or underlying layer) 176 may be the same, or facet layer 175 may be a different material from the substrate or underlying layer 176. Similar to the diffusive WGP 130 of FIG. 13, the thicknesses $t_{2-5}$ may be the same or may be different. This diffuser 180 may be manufactured similarly to polarizer 130, except that no wire grids are formed. Facets of different sizes or shapes help to create diffuse transmitted or reflected light. Facets of different depths also create diffuse transmitted or reflected light because the light travels through different thicknesses $t_{1-4}$ of material.

Figure 20:
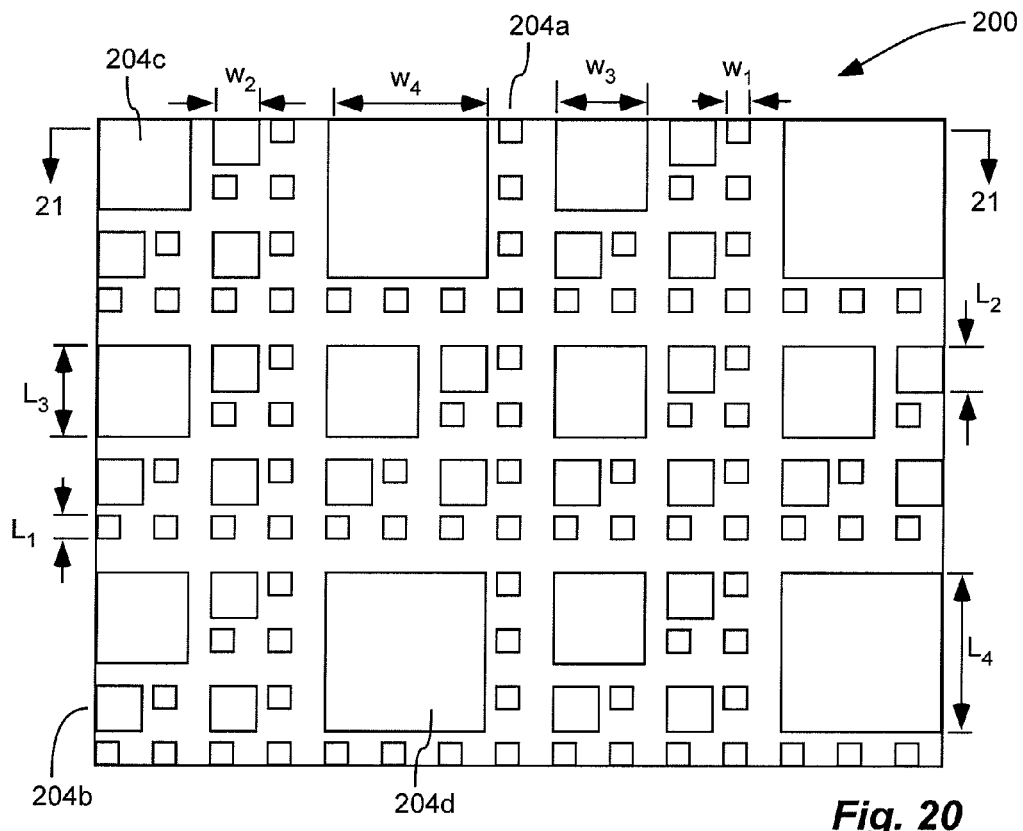
FIG. 20 is a schematic top view of a diffuser in accordance with an embodiment of the present invention.
Figure 21:
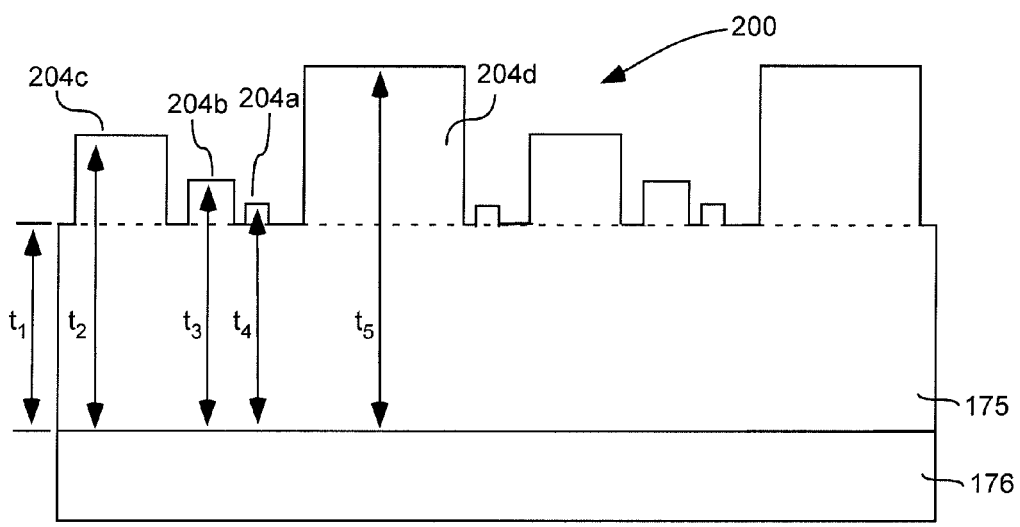
FIG. 21 is a schematic cross-sectional side view of the diffuser of FIG. 20 taken along line 21-21 in FIG. 20.

As illustrated in FIGS. 20-21, the facets 204a-d of another diffuser 200 are the locations that were masked during etching and thus are raised above surrounding etched locations. This diffuser 200 may be manufactured similarly to polarizer 140, except that no wire grids are formed. Facets of different sizes or shapes help to create diffuse transmitted or reflected light. Facets of different depths also create diffuse transmitted or reflected light because the light travels through different thicknesses $t_{1-4}$ of material.

Figure 22:
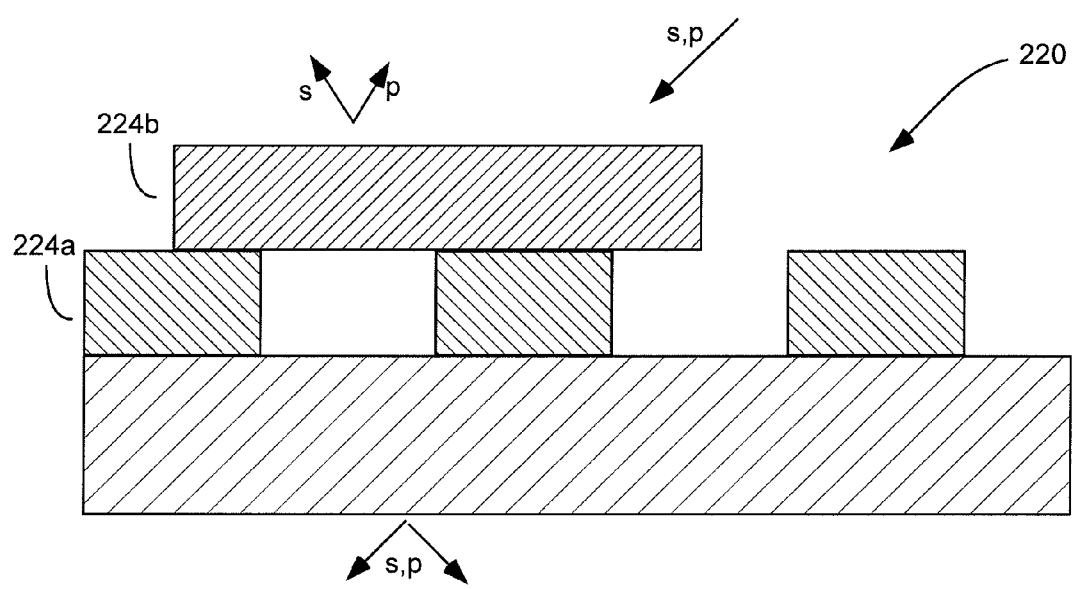
FIG. 22 is a schematic cross-sectional side view of a diffuser in accordance with an embodiment of the present invention Reference will now be made to the exemplary embodiments illustrated, and specific language will be used herein to describe the same. It will nevertheless be understood that no limitation of the scope of the invention is thereby intended.

As illustrated in FIG. 22, the facets of another diffuser 220 may be disposed on top of other facets. Facets 224a-b may be any material with the desired optical properties. There may be more than two layers of facets. All layers may be the same material or the layers of facets may be made of different materials. This diffuser 220 may be manufactured similarly to polarizer 100, except that no wire grids are formed. Multiple layers can provide improved light control and improved wavelength specificity.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A diffusive wire grid polarizer device, comprising:
   a) a substrate having a top surface and a bottom surface;
   b) at least one layer disposed over the top surface of the substrate;
   c) a wire grid formed in one of the at least one layer including an array of elongated parallel conductive wires with $P_{WGP} < \lambda/2$, where $P_{WGP}$ is the period of the wires, and $\lambda$ is the wavelength of light incident on the wires, to polarize the light by substantially reflecting light having an s-polarization orientation and substantially transmitting light having a p-polarization orientation incident on the array;
   d) at least sixteen facets of at least two different sizes formed in one of the at least one layer with a facet dimension transverse to the wires greater than $\lambda/2$ to substantially diffract both s-polarized light and p-polarized light incident on the at least two facets; and
   e) the at least sixteen facets forming distinct groups arranged in a fractal pattern.

2. A device as in claim 1, wherein the wire grid and the at least sixteen facets comprise a single layer such that the at least sixteen facets are interspersed through the array of wires and interrupt the array of wires.

3. A device as in claim 1, wherein the at least sixteen facets form distinct groups in the array of wires with four different sizes arranged in the fractal pattern.

4. A device as in claim 1, wherein the at least sixteen facets further includes four different sizes and four different surface areas.

5. A device as in claim 1, wherein the at least one layer includes at least two layers with one of the at least two layers containing the wire grid and a different one of the at least two layers containing the at least sixteen facets.

6. A device as in claim 5, wherein a distance from the bottom surface of the substrate to a top surface of at least one of the at least sixteen facets is different than a distance from the bottom surface of the substrate to a top surface of another of the at least sixteen facets.

7. A device as in claim 1, wherein the at least one layer includes at least three layers, and wherein:
   a) one of the at least three layers contains a wire grid;
   b) a second of the at least three layers contains at least sixteen facets; and
   c) a third of the at least three layers contains at least sixteen facets.

8. A device as in claim 1, wherein the at least one layer comprises:
   a) at least two layers of a wire grid; and
   b) at least three layers containing at least sixteen facets in each layer.

9. A device as in claim 1, wherein the at least sixteen facets are a solid material surrounded by areas of the layer which have been removed.

10. A device as in claim 1, wherein the at least sixteen facets are comprised of areas of the layer which have been removed, and are surrounded by areas of the layer which have not been removed.

11. A device as in claim 1, wherein a distance from the bottom surface of the substrate to a top surface of at least one of the at least sixteen facets is different than a distance from the bottom surface of the substrate to a top surface of another of the at least sixteen facets.

12. A device as in claim 1, wherein areas of the top surface of the substrate which is not covered with any of the at least sixteen facets is covered by the wire grid and the top surface of the at least sixteen facets is covered with the wire grid.

13. A device as in claim 1, wherein tops of the wires and tops of the facets terminate in a common plane.

* * * * *